(12) United States Patent
Liang et al.

(10) Patent No.: US 12,308,961 B2
(45) Date of Patent: May 20, 2025

(54) CHANNEL CODING AND MODULATION

(71) Applicant: ZTE Corporation, Guangdong (CN)

(72) Inventors: Chulong Liang, Guangdong (CN); Qiujin Guo, Guangdong (CN); Jin Xu, Guangdong (CN); Jun Xu, Guangdong (CN); Jian Kang, Guangdong (CN); Qiang Fu, Guangdong (CN)

(73) Assignee: ZTE Corporation, Guangdong (CN)

( * ) Notice: Subject to any disclaimer, the term of this patent is extended or adjusted under 35 U.S.C. 154(b) by 531 days.

(21) Appl. No.: 17/664,189

(22) Filed: May 19, 2022

(65) Prior Publication Data

US 2022/0286225 A1 Sep. 8, 2022

Related U.S. Application Data

(63) Continuation of application No. PCT/CN2020/102067, filed on Jul. 15, 2020.

(51) Int. Cl.
*H04L 1/00* (2006.01)
*H04L 27/18* (2006.01)

(52) U.S. Cl.
CPC .......... *H04L 1/0058* (2013.01); *H04L 1/0071* (2013.01); *H04L 27/18* (2013.01)

(58) Field of Classification Search
CPC ...... H04L 1/0058; H04L 1/0071; H04L 27/18
See application file for complete search history.

(56) References Cited

U.S. PATENT DOCUMENTS

| | | |
|---|---|---|
| 2007/0242764 A1 | 10/2007 | Anigstein et al. |
| 2010/0098180 A1 | 4/2010 | Wennstrom et al. |
| 2012/0207111 A1 | 8/2012 | Jang et al. |
| 2014/0362701 A1 | 12/2014 | Roh et al. |
| 2017/0366299 A1 | 12/2017 | Li et al. |
| 2019/0327024 A1 | 10/2019 | Lee et al. |
| 2020/0177307 A1 | 6/2020 | Pan |

FOREIGN PATENT DOCUMENTS

| | | |
|---|---|---|
| CN | 108696295 | 10/2018 |
| EP | 3442146 | 2/2019 |
| JP | 2006-295756 | 10/2006 |
| JP | 2009-533981 | 9/2009 |
| JP | 2009-239549 | 10/2009 |

(Continued)

OTHER PUBLICATIONS

International Search Report and Written Opinion for PCT/CN2020/102067, filed Jul. 15, 2020, 10 pages.

(Continued)

*Primary Examiner* — Natasha W Cosme

(74) *Attorney, Agent, or Firm* — Perkins Coie LLP

(57) ABSTRACT

The present application relates to methods, systems, and devices related to digital wireless communication, and more specifically, to techniques related to channel coding and modulation. In one exemplary aspect, a method for wireless communication is disclosed. The method includes performing multiple operations that include a first operation related to pre-channel coding and/or a second operation comprising attaching redundancy check bits in an order. The method can also include generating a transmission waveform by a first node using one or more bits for transmission to a second node over a wireless channel using information derived from the multiple operations.

20 Claims, 9 Drawing Sheets

(56) References Cited

FOREIGN PATENT DOCUMENTS

| JP | 2010-178273 | 8/2010 |
|----|-------------|--------|
| JP | 2010-278623 | 12/2010 |
| JP | 2016-122934 | 7/2016 |
| JP | 2019-201407 | 11/2019 |
| JP | 2019-205067 | 11/2019 |
| JP | 2020-535741 | 12/2020 |
| WO | 2004/082181 | 9/2004 |
| WO | 2010/122699 | 10/2010 |
| WO | 2018/052580 | 3/2018 |
| WO | 2020/108771 | 6/2020 |

OTHER PUBLICATIONS

Japanese Office Action for Application No. 2022-540380, dated Aug. 16, 2023, 12 pages with machine translation.
Japanese Notice of Allowance for Application No. 2022-540380, dated Jul. 24, 2024, 6 pages with machine translation.
Korean Office Action for Application No. 10-2022-7019975, dated Jun. 17, 2024, 11 pages with unofficial English summary.
Extended European Search Report for co-pending EP Application No. 20945293.7, mailed Nov. 18, 2022, 7 pages.
Iscan, et al. "Probabilistic Shaping Using 5G New Radio Polar Codes" IEEE Access, vol. 7 Mar. 4, 2019, pp. 22579-22587.
Article 94 Communication for co-pending EP Application No. 20945293.7, mailed Aug. 5, 2024, 5 pages.
JPO, Notice of Reasons for Refusal for Japanese Application No. 2022-540380, mailed on May 10, 2024, 7 pages with English translation.
Co-Pending Indian Application No. 202247030603, First Examination Report dated Sep. 25, 2023, 8 pages.

CHANNEL CODING AND MODULATION

CROSS-REFERENCE TO RELATED APPLICATION

This application is a continuation and claims priority to International Application No. PCT/CN2020/102067, filed on Jul. 15, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to channel coding and modulation.

In one exemplary aspect, a method for wireless communication is disclosed. The method includes performing multiple operations that include a first operation related to pre-channel coding and/or a second operation comprising attaching redundancy check bits in an order. The method can also include generating a transmission waveform by a first node using one or more bits for transmission to a second node over a wireless channel using information derived from the multiple operations.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Figure 1A:
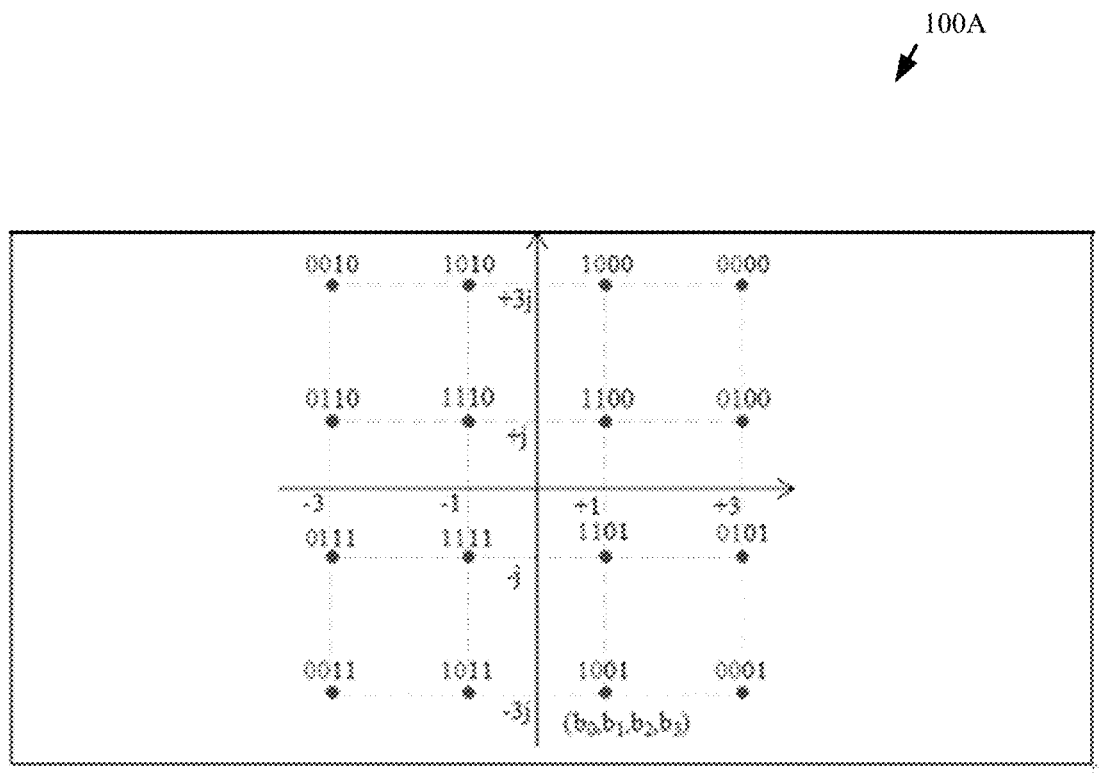
FIG. 1A provides a first example graph depicting a set of constellation points.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

In the fifth generation (5G) wireless and new radio (NR) communication systems of 3GPP (3GPP 5G), a first node (such as a user equipment (UE) or a base station (BS)), can transmit data bits to a second node (such as a BS or a UE) by partitioning data bits into transport blocks (TBs) for channel coding and modulation. The number of data bits of the transport block may be referred to as a transport block size (TBS). The data bits of a transport block may also be referred to as the payload. Channel coding and modulation schemes may be used to encode the payload into a modulation symbol sequence. A modulation symbol sequence may be a sequence of modulation symbols output from a modulation mapper. A modulation mapper may include a high-order modulation including a labeling of a constellation with the number of constellation points larger than 1. A constellation may include a set of complex values and each complex value is a constellation point. A modulation mapper with a modulation order Qm may take as input Qm bits and output a modulation symbol chosen from the constellation. The modulation order may also be the modulation order of the constellation. There are various types of constellations, such as M-ary quadrature amplitude modulation (MQAM), quadrature phase shift keying (QPSK), M-ary phase shift keying (MPSK), M-ary amplitude shift keying (MASK), and M-ary amplitude phase shift keying (MAPSK), as non-limiting examples.

A labeling may include a mapping between a set of bit sequences and a set of complex values. The bits associated to a complex value may be called the label of the complex value. The number of bits in the label of the complex value may be called the length of the label or the length of the labeling. A labeling of a constellation may be a mapping between a set of bit sequences and the set of constellation points. The modulation order of a constellation may also be the length of the labeling of the constellation. Table 1 may provide specific examples for labeling, for example, 00 is the label of the value 1+j in the labeling 1 and 1 is the label of the value −1 in the labeling 4. For a given constellation, there can be various types of labeling of the given constellation, such as Gray labeling and natural labeling, as non-limiting examples. Table 1 may provide two specific examples for the labeling of the set {α, 3α, 5α, 7α}, i.e., the labeling 2 and the labeling 3, where a is a positive real constant.

There may be a symbol set associated to a given modulation mapper. A symbol set may be a set of non-negative real values. An element in a symbol set may be called a symbol. For a modulation mapper with an MQAM constellation, the symbol set may contain all possible absolute values of the real part or the imaginary part of the constellation points in the MQAM constellation. The symbol set for an MQAM constellation with modulation order Qm may contain all odd integers between 0 and $2^{Qm/2}$ multiplying a positive real constant α. For example, the symbol set for 16QAM is the set {α, 3α}; the symbol set for 64QAM is the set {α, 3α, 5α, 7α}; the symbol set for 256QAM is the set {α, 3α, 5α, 7α, 9α, 11α, 13α, 15α}; the symbol set for 1024QAM is the set {α, 3α, 5α, 7α, 9α, 11α, 13α, 15α, 17α, 19α, 21α, 23α, 25α, 27α, 29α, 31α}, where α is a positive real constant. For a modulation mapper with an MAPSK constellation, the symbol set may contain all possible complex modulus of constellation points in the MAPSK constellation. For example, the symbol set for the 16APSK constellation in Table 3(b) is $\{\alpha_0, \alpha_1, \alpha_2, \alpha_3\}$, where $0<\alpha_0<\alpha_1<\alpha_2<\alpha_3$ are any positive real values; the symbol set for the 16APSK constellation in Table 3(c) is $\{\beta_0, \beta_2, \beta_3\}$, where $0<\beta_0<\beta_1<\beta_2<\beta_3$ are any positive real values.

Figure 1B:
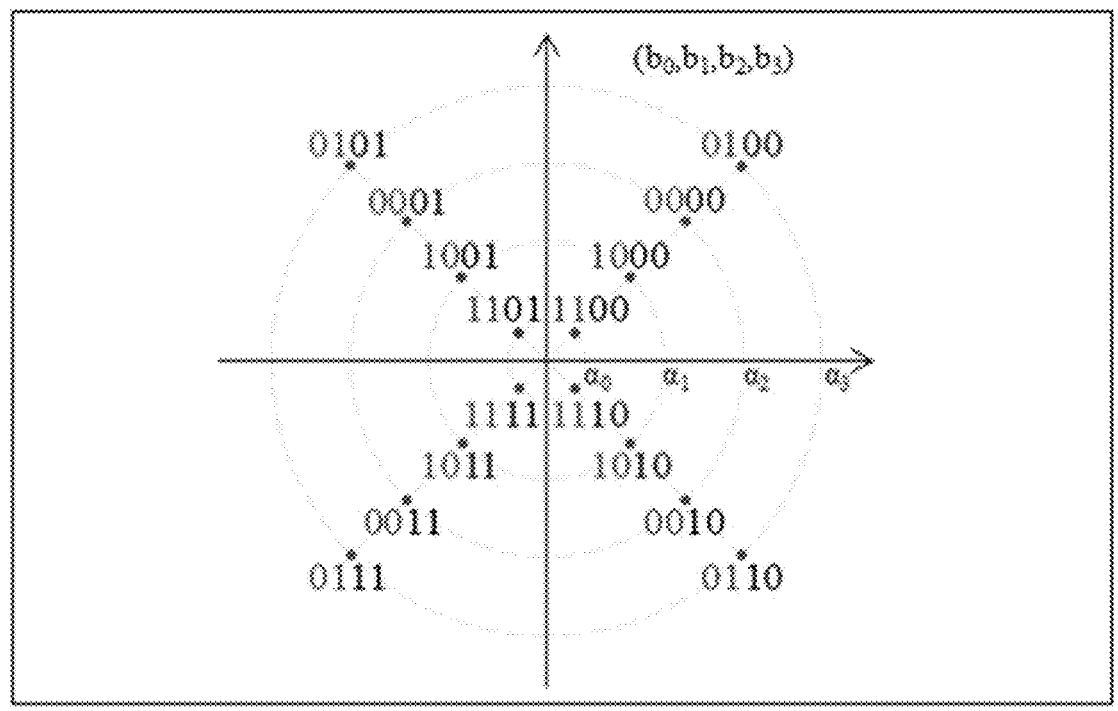
FIG. 1B provides a second example graph depicting a set of constellation points.
Figure 1C:
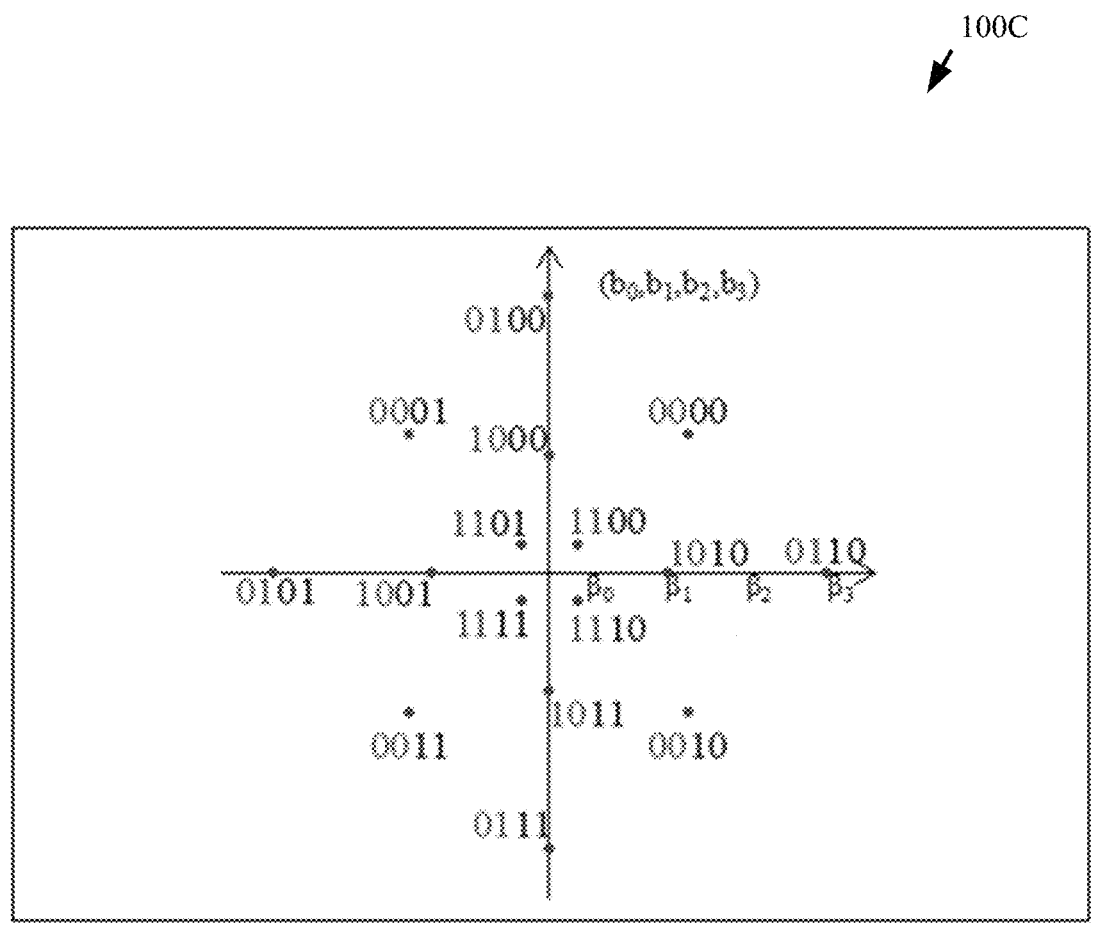
FIG. 1C provides a third example graph depicting a set of constellation points.

The definition of labeling may also be applied to symbol sets. This may not be limited to one type of labeling of a given symbol set. Table 1 may provide two specific examples for labeling of the symbol set {α, 3α, 5α, 7α}, i.e., the labeling 2 and the labeling 3. The label of a symbol in a constellation point may include a sub bit sequence of the label of the constellation point. Specifically, for MQAM constellations with modulation order Qm, Qm/2-1 bits among the Qm bits of the label of a constellation point may be the label of the symbol of the real part of the constellation point and other Qm/2-1 bits among the Qm bits of the label of a constellation point is the label of the symbol of the imaginary part of the constellation point, where Qm≥4. For MAPSK constellations with modulation order Qm, Qa bits among the Qm bits of the label of a constellation point may be the label of the symbol of the constellation point, where 0≤Qa<Qm. Table 2 may provide the symbol set as well as the corresponding labeling for 16QAM, 64QAM, and 256QAM of 3GPP 5G. Tables 3A-3C may provide examples for the relation between symbols, constellation points, the labeling of the symbol set and the labeling of the constellation with input bits ($b_0, b_1, \ldots b_{Qm-1}$) for a modulation mapper with a modulation order Qm. FIGS. 1A-1C provide example graphs 100a-c depicting constellation points for Tables 3A-3C, respectively.

A symbol sequence may include a sequence with each element chosen from a symbol set. The energy of a symbol sequence may be defined as the sum of the weight of each symbol in the symbol sequence. The weight of an symbol e may include the function value f(e) with f(•) being a monotonic increasing real-value function that maps non-negative real value into non-negative real value. Specific examples for f(e) are f(e)=e, $f(e)=e^2$, and f(e)=2e+1. The power of a modulation symbol may include the square of the complex modulus of the modulation symbol. The power of a modulation symbol sequence may include the sum of the power of each modulation symbol in the modulation symbol sequence.

Theoretically, a channel coding and modulation scheme outputs modulation symbols chosen from a constellation with equal probability may not be efficient. An efficient scheme can output different constellation points with different probabilities. Specifically, a constellation point with smaller power may appear more frequently than a constellation point with larger power in the output of the channel coding and modulation scheme.

In the present embodiments, channel coding and modulation schemes can encode a payload into a modulation symbol sequence with an unequal probability constellation points.

In the following, the size of a set, or the set size, may include the number of elements in the set. The notation $\lfloor z \rfloor$ for real values may stand for the largest integer not greater than z. The notation $\lceil z \rceil$ for real values may stand for the smallest integer not less than z. The notation round(z) for real values may stand for the nearest integer to z. The notation exp(•) may include the natural exponential function. The notation "mod" may include the modulo operation. The notation π is the Pi.

TABLE 1

Examples for labeling ( $j = \sqrt{-1}$ is the imaginary unit)

| labeling 1 | | labeling 2 | | labeling 3 | | labeling 4 | |
|---|---|---|---|---|---|---|---|
| complex value | bit sequence | complex value (α > 0) | bit sequence | complex value (α > 0) | bit sequence | complex value | bit sequence |
| 1 + j | 00 | α | 11 | α | 01 | −1 | 1 |
| 1 − j | 01 | 3α | 10 | 3α | 00 | | |
| −1 + j | 10 | 5α | 00 | 5α | 10 | 1 | 0 |
| 1 − j | 11 | 7α | 01 | 7α | 11 | | |

TABLE 2

| symbol in symbol set for real part or imaginary part | $16QAM\left(\alpha = \frac{1}{\sqrt{10}}\right)$ Qm = 4 label of symbol ($b_2$) or ($b_3$) | $64QAM\left(\alpha = \frac{1}{\sqrt{42}}\right)$ Qm = 6 label of symbol ($b_2, b_4$) or ($b_3, b_5$) | $256QAM\left(\alpha = \frac{1}{\sqrt{170}}\right)$ Qm = 8 label of symbol ($b_2, b_4, b_6$) or ($b_3, b_5, b_7$) |
|---|---|---|---|
| α | 0 | 01 | 011 |
| 3α | 1 | 00 | 010 |
| 5α | N/A | 10 | 000 |
| 7α | N/A | 11 | 001 |
| 9α | N/A | N/A | 101 |
| 11α | N/A | N/A | 100 |

TABLE 2-continued

| symbol in symbol set for real part or imaginary part | $16QAM\left(\alpha = \frac{1}{\sqrt{10}}\right)$ $Qm = 4$ label of symbol $(b_2)$ or $(b_3)$ | $64QAM\left(\alpha = \frac{1}{\sqrt{42}}\right)$ $Qm = 6$ label of symbol $(b_2, b_4)$ or $(b_3, b_5)$ | $256QAM\left(\alpha = \frac{1}{\sqrt{170}}\right)$ $Qm = 8$ label of symbol $(b_2, b_4, b_6)$ or $(b_3, b_5, b_7)$ |
|---|---|---|---|
| $13\alpha$ | N/A | N/A | 110 |
| $15\alpha$ | N/A | N/A | 111 | symbol sets and labeling for MQAM constellation with input bits ($b_0, b_1, \ldots, b_{Qm-1}$), Qm is the modulation order.

TABLE 3(a)

Examples for the relation between symbols, constellation points, the labeling of the symbol set and the labeling of the 16QAM constellation with modulation order Qm = 4 for input bits ($b_0, b_1, b_2, b_3$) ($j = \sqrt{-1}$ is the imaginary unit)

| constellation point in the constellation (x) | symbol for the real part in the symbol set {+1, +3} | symbol for the imaginary part in symbol set {+1, +3} | label of constellation point ($b_0, b_1, b_2, b_3$) with label of the symbol in the real part of a constellation point being ($b_0$) and label of the symbol in the imaginary part of a constellation point being ($b_1$) |
|---|---|---|---|
| $1 + j$ | +1 | +1 | 1100 |
| $1 - j$ | +1 | +1 | 1101 |
| $-1 + j$ | +1 | +1 | 1110 |
| $-1 - j$ | +1 | +1 | 1111 |
| $1 + 3j$ | +1 | +3 | 1000 |
| $1 - 3j$ | +1 | +3 | 1001 |
| $-1 + 3j$ | +1 | +3 | 1010 |
| $-1 - 3j$ | +1 | +3 | 1011 |
| $3 + j$ | +3 | +1 | 0100 |
| $3 - j$ | +3 | +1 | 0101 |
| $-3 + j$ | +3 | +1 | 0110 |
| $-3 - j$ | +3 | +1 | 0111 |
| $3 + 3j$ | +3 | +3 | 0000 |
| $3 - 3j$ | +3 | +3 | 0001 |
| $-3 + 3j$ | +3 | +3 | 0010 |
| $-3 - 3j$ | +3 | +3 | 0011 |

TABLE 3(b)

Example for relation between symbols, constellation points, the labeling of the symbol set and the labeling of a 16APSK with modulation order Qm = 4 for input bits ($b_0, b_1, b_2, b_3$) with Qa = 2 ($j = \sqrt{-1}$ imaginary unit)

| constellation point in the constellation (x) | symbol in the symbol set $\{\alpha_0, \alpha_1, \alpha_2, \alpha_3\}$ with $0 < \alpha_0 < \alpha_1 < \alpha_2 < \alpha_3$ | label of symbol ($b_0, b_1$) | label of constellation point ($b_0, b_1, b_2, b_3$) |
|---|---|---|---|
| $\alpha_0 \cdot \exp(j \cdot \pi/4)$ | $\alpha_0$ | 11 | 1100 |
| $\alpha_0 \cdot \exp(j \cdot 3\pi/4)$ | $\alpha_0$ | 11 | 1101 |
| $\alpha_0 \cdot \exp(j \cdot 5\pi/4)$ | $\alpha_0$ | 11 | 1111 |
| $\alpha_0 \cdot \exp(j \cdot 7\pi/4)$ | $\alpha_0$ | 11 | 1110 |
| $\alpha_1 \cdot \exp(j \cdot \pi/4)$ | $\alpha_1$ | 10 | 1000 |
| $\alpha_1 \cdot \exp(j \cdot 3\pi/4)$ | $\alpha_1$ | 10 | 1001 |
| $\alpha_1 \cdot \exp(j \cdot 5\pi/4)$ | $\alpha_1$ | 10 | 1011 |
| $\alpha_1 \cdot \exp(j \cdot 7\pi/4)$ | $\alpha_1$ | 10 | 1010 |
| $\alpha_2 \cdot \exp(j \cdot \pi/4)$ | $\alpha_2$ | 00 | 0000 |
| $\alpha_2 \cdot \exp(j \cdot 3\pi/4)$ | $\alpha_2$ | 00 | 0001 |
| $\alpha_2 \cdot \exp(j \cdot 5\pi/4)$ | $\alpha_2$ | 00 | 0011 |
| $\alpha_2 \cdot \exp(j \cdot 7\pi/4)$ | $\alpha_2$ | 00 | 0010 |
| $\alpha_3 \cdot \exp(j \cdot \pi/4)$ | $\alpha_3$ | 01 | 0100 |
| $\alpha_3 \cdot \exp(j \cdot 3\pi/4)$ | $\alpha_3$ | 01 | 0101 |
| $\alpha_3 \cdot \exp(j \cdot 5\pi/4)$ | $\alpha_3$ | 01 | 0111 |
| $\alpha_3 \cdot \exp(j \cdot 7\pi/4)$ | $\alpha_3$ | 01 | 0110 |

TABLE 3(c)

Examples for the relation symbols, constellation points, the labeling of the symbol set and the labeling of a 16APSK constellation with modulation order Qm = 4 for input bits ($b_0, b_1, b_2, b_3$) with Qa = 2 ($j = \sqrt{-1}$ is the imaginary unit)

| constellation point in the constellation (x) with $\Delta = \pi/4$ | symbol in the symbol set $\{\beta_0, \beta_1, \beta_2, \beta_3\}$ with $0 < \beta_0 < \beta_1 < \beta_2 < \beta_3$ | label of symbol ($b_0, b_1$) | label of constellation point ($b_0, b_1, b_2, b_3$) |
|---|---|---|---|
| $\beta_0 \cdot \exp(j \cdot \pi/4)$ | $\beta_0$ | 11 | 1100 |
| $\beta_0 \cdot \exp(j \cdot 3\pi/4)$ | $\beta_0$ | 11 | 1101 |
| $\beta_0 \cdot \exp(j \cdot 5\pi/4)$ | $\beta_0$ | 11 | 1111 |
| $\beta_0 \cdot \exp(j \cdot 7\pi/4)$ | $\beta_0$ | 11 | 1110 |
| $\beta_1 \cdot \exp(j \cdot \pi/4 + j \cdot \Delta)$ | $\beta_1$ | 10 | 1000 |
| $\beta_1 \cdot \exp(j \cdot 3\pi/4 + j \cdot \Delta)$ | $\beta_1$ | 10 | 1001 |
| $\beta_1 \cdot \exp(j \cdot 5\pi/4 + j \cdot \Delta)$ | $\beta_1$ | 10 | 1011 |
| $\beta_1 \cdot \exp(j \cdot 7\pi/4 + j \cdot \Delta)$ | $\beta_1$ | 10 | 1010 |
| $\beta_2 \cdot \exp(j \cdot \pi/4)$ | $\beta_2$ | 00 | 0000 |
| $\beta_2 \cdot \exp(j \cdot 3\pi/4)$ | $\beta_2$ | 00 | 0001 |
| $\beta_2 \cdot \exp(j \cdot 5\pi/4)$ | $\beta_2$ | 00 | 0011 |
| $\beta_2 \cdot \exp(j \cdot 7\pi/4)$ | $\beta_2$ | 00 | 0010 |
| $\beta_3 \cdot \exp(j \cdot \pi/4 + j \cdot \Delta)$ | $\beta_3$ | 01 | 0100 |
| $\beta_3 \cdot \exp(j \cdot 3\pi/4 + j \cdot \Delta)$ | $\beta_3$ | 01 | 0101 |
| $\beta_3 \cdot \exp(j \cdot 5\pi/4 + j \cdot \Delta)$ | $\beta_3$ | 01 | 0111 |
| $\beta_3 \cdot \exp(j \cdot 7\pi/4 + j \cdot \Delta)$ | $\beta_3$ | 01 | 0110 |

High-order M-ary quadrature amplitude modulation (MQAM) constellation may be used to improve spectral efficiency in the 3rd Generation Partnership Project (3GPP). However, because of the non-linearity of transmission medium, the marginal benefits obtained in higher order MQAM constellations may be gradually disappearing. New channel coding and modulation techniques may need be used to further improve efficiency for higher order MQAM. For improving efficiency for higher order MQAM, channel coding and modulation schemes are provided in the present embodiments.

System Overview

The present embodiments relate to channel coding and modulation. Tables 4A-C provide examples for labeling a symbol set.

TABLE 4A

Example for labeling of a symbol set with the symbol set $\Phi = \{1, 2, 6\}$

| Symbol in $\Phi$ | Labeling 1 (Qa = 2) ($b_0, b_1$) | Labeling 2 (Qa = 2) ($b_0, b_1$) | Labeling 3 (Qa = 2) ($b_0, b_1$) | Labeling 4 (Qa = 2) ($b_0, b_1$) | Labeling 5 (Qa = 3) ($b_0, b_1, b_2$) | Labeling 6 (Qa = 3) ($b_0, b_1, b_2$) | Labeling 7 (Qa = 3) ($b_0, b_1, b_2$) | Labeling 8 (Qa = 3) ($b_0, b_1, b_2$) |
|---|---|---|---|---|---|---|---|---|
| 1 | 11 | 11 | 01 | 10 | 111 | 111 | 101 | 101 |
| 2 | 01 | 10 | 10 | 01 | 110 | 101 | 100 | 001 |
| 6 | 00 | 00 | 00 | 00 | 100 | 100 | 001 | 100 |

TABLE 4B

Example for labeling of a symbol set with the symbol set $\Phi = \{1, 3, 5, 7\}$

| symbol in $\Phi$ | Labeling 1 (Qa = 2) ($b_0, b_1$) | Labeling 2 (Qa = 2) ($b_0, b_1$) | Labeling 3 (Qa = 2) ($b_0, b_1$) | Labeling 4 (Qa = 2) ($b_0, b_1$) | Labeling 5 (Qa = 3) ($b_0, b_1, b_2$) | Labeling 6 (Qa = 3) ($b_0, b_1, b_2$) | Labeling 7 (Qa = 3) ($b_0, b_1, b_2$) | Labeling 8 (Qa = 3) ($b_0, b_1, b_2$) |
|---|---|---|---|---|---|---|---|---|
| 1 | 11 | 11 | 11 | 01 | 111 | 111 | 110 | 001 |
| 3 | 01 | 10 | 10 | 11 | 110 | 110 | 111 | 011 |
| 5 | 00 | 00 | 01 | 10 | 100 | 101 | 101 | 111 |
| 7 | 10 | 01 | 00 | 00 | 101 | 011 | 100 | 000 |

TABLE 4C

Example for labeling of a symbol set with the symbol set $\Phi = \{1, 3, 5, 7, 9, 11, 13, 15\}$

| symbol in $\Phi$ | Labeling 1 (Qa = 3) ($b_0, b_1, b_2$) | Labeling 2 (Qa = 3) ($b_0, b_1, b_2$) | Labeling 3 (Qa = 3) ($b_0, b_1, b_2$) | Labeling 4 (Qa = 3) ($b_0, b_1, b_2$) | Labeling 5 (Qa = 3) ($b_0, b_1, b_2$) | Labeling 6 (Qa = 3) ($b_0, b_1, b_2$) | Labeling 7 (Qa = 3) ($b_0, b_1, b_2$) | Labeling 8 (Qa = 3) ($b_0, b_1, b_2$) |
|---|---|---|---|---|---|---|---|---|
| 1 | 111 | 111 | 111 | 111 | 111 | 111 | 111 | 111 |
| 3 | 110 | 110 | 101 | 101 | 011 | 011 | 011 | 110 |
| 5 | 100 | 010 | 100 | 001 | 001 | 010 | 010 | 101 |
| 7 | 101 | 011 | 110 | 011 | 101 | 110 | 110 | 011 |
| 9 | 001 | 001 | 010 | 010 | 100 | 100 | 100 | 100 |
| 11 | 011 | 101 | 011 | 110 | 110 | 101 | 000 | 010 |
| 13 | 010 | 100 | 001 | 100 | 010 | 001 | 001 | 001 |
| 15 | 000 | 000 | 000 | 000 | 000 | 000 | 101 | 000 |

Example Embodiment 1

Example Embodiment 1 can provide a detailed description of a pre-channel coding. In this embodiment, channel coding and modulation for a transport block comprises the following information: channel coding information, pre-channel coding information, transport block CRC attachment information, code block segmentation information, code block CRC attachment information, etc. The channel coding can include a low-density parity-check coding, a polar coding, a turbo coding, a convolutional coding, as non-limited examples. The pre-channel coding may include a process comprising any of a bit-to-symbol encoding and a symbol-to-bit conversion.

In a specific example of this embodiment, the bit-to-symbol encoding can encode a first bit sequence u into a first symbol sequence A using a symbol set $\Phi$. Denote the length of the first bit sequence u as Kd. Denote the length of the first symbol sequence A as Na. Denote the set size of the symbol set $\Phi$ as Ma. The length of the labeling of the symbol set $\Phi$, denoted as Qa, may be an integer such that $2^{Qa} \geq Ma$.

Further, in a specific example of this embodiment, the symbol-to-bit conversion converts the first symbol sequence $A=[A_0, A_1, A_2, \ldots, A_{Na-1}]$ into a second bit sequence $v=[v_0, v_1, v_2, \ldots, v_{Nv-1}]$ according to a labeling of the symbol set $\Phi$ by converting each symbol $A_i$ into bits equal to the length of the labeling of the symbol set $\Phi$. One of the specific implementation of the symbol-to-bit conversion is that the bits $(v_{i \cdot Qa}, v_{i \cdot Qa+1}, \ldots, Q_{i \cdot Qa+Qa-1})$ of the second bit sequence v is the label of the symbol $A_i$ for $i=0, 1, 2, \ldots, Na-1$.

Further, in a specific example of this embodiment, Table 2 may provide one of the specific implementation of the labeling of the symbol set $\Phi$ for 16QAM, 64QAM and 256QAM in the 3GPP 5G.

Further, in an example of this embodiment, one of the specific implementation of the labeling of the symbol set $\Phi$ is that the label of the smallest symbol in the symbol set $\Phi$ has bit "1" more than the label of the largest symbol in the symbol set $\Phi$. Table 4B gives a specific example that the symbol "1" is the smallest symbol with the label "11" having 2 bit "1" while the largest symbol "7" with the label "10" having 1 bit "1" in the labeling 2. Table 4A-C gives many specific examples of the label of symbol for three symbol sets $\{1,2,6\}$, $\{1,3,5,7\}$, $\{1,3,5,7,9,11,13,15\}$ with Qa=2 and 3.

Further, in an example of this embodiment, Table 4C can provide specific implementations of the labeling of the symbol set $\Phi$ is that the label of the smallest symbol in the symbol set $\Phi$ is the all bit 1's sequence.

Further, in a specific example of this embodiment, Table 3 can provide one of specific implementations of the labeling of the symbol set Φ that the labeling of the associated constellation of the modulation mapper have the following property: the label with all bits being "1" is associated to the constellation point with the smallest power. the constellation point −1−j with the smallest power in Table 3A is associated to the label "1111", the constellation point $\alpha_0 \cdot \exp(j \cdot 5\pi/4)$ with the smallest power in Table 3B is associated to the label "1111", the constellation point $\beta_0 \cdot \exp(j \cdot 5\pi/4)$ with the smallest power in Table 3C is associated to the label "1111", where $j=\sqrt{-1}$ is the imaginary unit.

Further, in a specific example of this embodiment, the bit-to-symbol encoding may include any of source coding related encoding, energy threshold encoding, minimum energy encoding, variable-length encoding, non-linear coding, etc.

Further, in a specific example of this embodiment, the source coding related encoding can encode the first bit sequence u into the first symbol sequence A according to a probability related parameter.

One of the specific implementations for the probability related parameter may include a probability mass function (PMF) of the symbol set Φ. One of the specific implementations for using the probability mass function of the symbol set $\Phi=\{\varphi_0, \varphi_1, \ldots, \varphi_{Ma-1}\}$ may be to calculate the number of symbol φi appears in the first symbol sequence A as $$Num(\varphi_i) = \left\lfloor Na \cdot \sum_{j=0}^{i} Pr\{\varphi_j\} \right\rfloor - \left\lfloor Na \cdot \sum_{j=0}^{i-1} Pr\{\varphi_j\} \right\rfloor,$$

where the summation in the right may be zero for i=0. Take Φ={1, 3, 5} with the probability mass function Pr{1}=0.4, Pr{3}=0.3, Pr{5}=0.3 and Na=5 as an example as follows.

Num(1)=⌊5·Pr{1}⌋=⌊5·0.4⌋=2,

Num(3)=⌊5·Pr{1}+5·Pr{3}⌋−⌊5·Pr{1}⌋=⌊5×0.4+5× 0.3⌋−2=⌊3.5⌋−2=1,

Num(5)=⌊5·Pr{1}+5·Pr{3}+5·Pr{5}⌋−⌊5·Pr{1}+ 5·Pr{3}⌋=⌊5×0.4+5×0.3+5×0.3⌋−⌊3.5⌋=2.

One of the specific implementations for using the probability mass function of the symbol set $\Phi=\{\varphi_0, \varphi_1, \ldots, \varphi_{Ma-1}\}$ may be to calculate the number of symbol $\varphi_i$ appears in the first symbol sequence A $$Num(\varphi_i) = \text{round}\left(Na \cdot \sum_{j=0}^{i} Pr\{\varphi_j\}\right) - \text{round}\left(Na \cdot \sum_{j=0}^{i-1} Pr\{\varphi_j\}\right),$$

where the summation in the right may be zero for i=0. Take Φ={1, 3, 5} with the probability mass function Pr{1}=0.4, Pr{3}=0.3, Pr{5}=0.3 and Na=5 as an example as follows.

Num(1)=round(5·Pr{1})=round(5·0.4)=2,

Num(3)=round(5·Pr{1}+5·Pr{3})−round(5·Pr{1})= round(3.5)−2=2,

Num(5)=round(5·Pr{1}+5·Pr{3}+5·Pr{5})−round (5·Pr{1}+5·Pr{3})=5−round(3.5)=1.

The number of symbol $\varphi_i$ appearing in the first symbol sequence A, the first symbol sequence A may have the number of 1, 3, and 5 being Num(1), Num(3) and Num(5). Using the round(•) operation, Table 5 may provide one of the specific example for Φ={1, 3, 5} with the probability mass function Pr{1}=0.4, Pr{3}=0.3, Pr{5}=0.3, Kd=4 and Na=5.

TABLE 5

The source coding related encoding with a single PMF as parameters using the round (·) operation for Kd = 4 and Na = 5

| PMF for the symbol set Φ = (1, 3, 5) | number of appearances of each symbol | the first bit sequence u = [u₀, u₁, u₂, u₃] | The first symbol sequence A = [A₀, A₁, A₂, A₃, A₄] |
|---|---|---|---|
| Pr{1} = 0.4, Pr{3} = 0.3, Pr{5} = 0.3. | Num(1) = 2, Num(3) = 2, Num(5) = 1. | 0000 | 11335 |
| | | 0001 | 11353 |
| | | 0010 | 13135 |
| | | 0011 | 13315 |
| | | 0100 | 13513 |
| | | 0101 | 15133 |
| | | 0110 | 15331 |
| | | 0111 | 31153 |
| | | 1000 | 31351 |
| | | 1001 | 31513 |
| | | 1010 | 33115 |
| | | 1011 | 33511 |
| | | 1100 | 35131 |
| | | 1101 | 51133 |
| | | 1110 | 51331 |
| | | 1111 | 53131 |

One of the specific implementations for the probability related parameter may include Qa probability mass functions for the set {0, 1}, where Qa is the length of the labeling of the symbol set Φ. Denote the Qa PMFs as $PMF_0$, $PMF_1$, ..., $PMF_{Qa-1}$. One of the specific implementations for using the Qa PMFs is as follows.

Dividing the first bit sequence u into Qa parts $u_0$, $u_1$, $u_{Qa-1}$. Regarding the set {0, 1} as a symbol set and using $PMF_i$ to encode $u_i$ into a third bit sequence $y_1$ of Na bits as the examples in Table 6. Taking the i-th bit from each of the third bit sequences $y_0, y_1, \ldots$, and $y_{Qa-1}$ to form a label $(y_{0,i}, y_{1,i}, \ldots, y_{Qa-1,i})$ and map to the symbol $A_i$ of the first symbol sequence A according to the labeling of the symbol set Φ such that $A_i$ has a label $(y_{0,i}, y_{1,i}, \ldots, y_{Qa-1,i})$, where i=0, 1, 2, ..., Na−1. Using the round(·) operation, Table 6 may provide one of the specific example for Φ={1, 3, 5, 7} using the labeling 3 in Table 4B, where other parameters are as follows.

Qa=2, Kd=4, Na=5;

The $PMF_0$ is Pr{0}=0.35, Pr{1}=0.65; The $PMF_1$ is Pr{0}=0.2, Pr{1}=0.8;

The first bit sequence u=[u₀, u₁, u₂, u₃] is divided into Qa=2 parts with u₀=[u₀, u₁, u₂] of length 3 bits and u₁=[u₃] of length 1 bit.

For u₀, Num(0)=round(5×0.35)=2, Num(1)=round(5× 0.35+5×0.65)−2=3;

For u₁, Num(0)=round(5×0.20)=1, Num(1)=round(5× 0.20+5×0.80)−1=4.

TABLE 6

| the first bit sequence $u = [u_0, u_1, u_2, u_3]$ $\begin{pmatrix} u_0 \\ u_1 \end{pmatrix} = \begin{pmatrix} u_0, u_1, u_2 \\ u_3 \end{pmatrix}$ | sequences $\begin{pmatrix} y_0 \\ y_1 \end{pmatrix} = \begin{pmatrix} y_{0,0}, y_{0,1}, y_{0,2}, y_{0,3}, y_{0,4} \\ y_{1,0}, y_{1,1}, y_{1,2}, y_{1,3}, y_{1,4} \end{pmatrix}$ | the first symbol sequence $A = [A_0, A_1, A_2, A_3, A_4]$ |
|---|---|---|
| $\begin{pmatrix} 000 \\ 0 \end{pmatrix}$ | 00111; 11110 | 55113 |
| $\begin{pmatrix} 000 \\ 1 \end{pmatrix}$ | 00111; 11011 | 55311 |
| $\begin{pmatrix} 001 \\ 0 \end{pmatrix}$ | 01011; 11110 | 51513 |
| $\begin{pmatrix} 001 \\ 1 \end{pmatrix}$ | 01011; 11011 | 51711 |
| $\begin{pmatrix} 010 \\ 0 \end{pmatrix}$ | 01101; 11110 | 51153 |
| $\begin{pmatrix} 010 \\ 1 \end{pmatrix}$ | 01101; 11011 | 51351 |
| $\begin{pmatrix} 011 \\ 0 \end{pmatrix}$ | 01110; 11110 | 51117 |
| $\begin{pmatrix} 011 \\ 1 \end{pmatrix}$ | 01110; 11011 | 51315 |
| $\begin{pmatrix} 100 \\ 0 \end{pmatrix}$ | 10101; 11110 | 15153 |
| $\begin{pmatrix} 100 \\ 1 \end{pmatrix}$ | 10101; 11011 | 15351 |
| $\begin{pmatrix} 101 \\ 0 \end{pmatrix}$ | 10110; 11110 | 15117 |
| $\begin{pmatrix} 101 \\ 1 \end{pmatrix}$ | 10110; 11011 | 15315 |
| $\begin{pmatrix} 110 \\ 0 \end{pmatrix}$ | 11001; 11110 | 11553 |
| $\begin{pmatrix} 110 \\ 1 \end{pmatrix}$ | 11001; 11011 | 11751 |
| $\begin{pmatrix} 111 \\ 0 \end{pmatrix}$ | 11010; 11110 | 11517 |
| $\begin{pmatrix} 111 \\ 1 \end{pmatrix}$ | 11010; 11011 | 11715 |

The source coding related encoding with two PMFs Pr{0} = 0.35, Pr{1} = 0.65 for $y_0$ and Pr{0} = 0.2, Pr{1} = 0.8 for $y_1$ for the set {0, 1} as parameters. Kd = 4, Na = 5. Num(0) = 2, Num(1) = 3 for $y_0$; Num(0) = 1, Num(1) = 4 for $y_1$. The labeling of the symbol set $\Phi$ = {1, 3, 5, 7} is {11, 10, 01, 00}.

One of the specific implementations for the probability related parameter may include a non-negative integer set with a one-to-one mapping to the symbol set and the sum of the elements in the non-negative integer set is equal to the length of the first symbol sequence A. One of the specific implementations may be that the non-negative integer set has elements being the number of each symbol $\varphi_i$ appearing in the first symbol sequence A. The encoding may be the same as Table 5.

One of the specific implementations for the probability related parameter may be R positive integer sets with R>1. One of the specific implementations may be that the R positive integer sets are the number of 0's and 1's in each $y_i$ of Table 6, where R equals to the length of the labeling of the symbol set Qa and the encoding is the same as Table 6.

One of the specific implementations may be that each of R positive integer sets is the set {Num($\varphi_0$), Num($\varphi_1$), ..., Num($\varphi_{Ma-1}$)} with encoding as follows.

Construct a one-to-one mapping between a prefix-free code of R codewords and the R positive integer sets. One of the specific implementations is R=3 and the prefix-free code may be {0, 10, 11} and the R positive integer sets are {3,2}, {4,1} and {1,4} for the symbol set {1, 3} with one-to-one mapping 0→{3,2}; 10→{4,1}; 11→{1,4}.

Select the positive integer set that corresponding to the prefix bits of the first bit sequence u and encode as Table 5. For example, u=[0,0,1,1], the prefix bit 0 is a codeword of the prefix-free code and the corresponding positive integer set {3,2} is used as the parameter {Num(1), Num(3)} for the encoding in Table 5. The rest bits in u as input, i.e., [0,1,1].

Another example is u=[1,0,1,1], the prefix bits 10 is a codeword of the prefix-free code the corresponding positive integer set {4,1} is used as the parameter {Num(1), Num(3)} for the encoding with the rest bits in u as input, i.e., [1,1]. Table 7 gives the details for the encoding.

TABLE 7

The source coding related encoding with multiple positive integer sets as parameter for Kd = 4 and Na = 5 for the symbol set Φ = {1, 3}

| Positive integer set, i.e., number of appearances of each symbol | the first bit sequence u = [$u_0$, $u_1$, $u_2$, $u_3$], the bold bit(s) is used for selecting the positive integer set | The first symbol sequence A = [$A_0$, $A_1$, $A_2$, $A_3$, $A_4$] |
|---|---|---|
| {3, 2} with Num(1) = 3, Num(3) = 2. | 0000 | 11133 |
| | 0001 | 11313 |
| | 0010 | 11331 |
| | 0011 | 13113 |
| | 0100 | 13311 |
| | 0101 | 31113 |
| | 0110 | 31131 |
| | 0111 | 31311 |
| (4, 1) with Num(1) = 4, Num(3) = 1 | 1000 | 11113 |
| | 1001 | 11131 |
| | 1010 | 11311 |
| | 1011 | 13111 |
| (1, 4) with Num(1) = 1, Num(3) = 4. | 1100 | 13333 |
| | 1101 | 31333 |
| | 1110 | 33133 |
| | 1111 | 33313 |

Further, in a specific example of this embodiment, the energy threshold encoding encodes the first bit sequence u into the first symbol sequence A according to a pre-defined value $E_m$>0 such that the sequence energy of any of the $2^{Kd}$ possible output of the energy threshold encoding is less than or equal to $E_m$. One of the specific implementation is discussed as follows.

The sequence energy may be defined as the square sum of the symbols in the first symbol sequence as example.

Among all the $Ma^{Na}$ symbol sequences of length Na for the symbol set Φ, denote $T_i(a_0, a_1, \ldots, a_i)$ as the number of symbol sequences with the first i symbols being $a_0$, $a_1, \ldots, a_i$ and the sequence energy less than or equal to $E_m$. Take the pre-defined value $E_m$=28, the symbol set Φ= {1, 3, 5}, Na=4 as an example. Then,

- $T_3(1,3,3,3)$=1 since [1,3,3,3] itself has an energy less than or equal to 28;
- $T_2(1,3,5)$=0 since $1^2+3^2+5^2$=35>28;
- $T_2(1,3,3)$=2 since both [1,3,3,1] and [1,3,3,3] have energy not greater than 28.

Take Kd=4 as an example. The encoding from the first bit sequence u=[$u_0$, $u_1$, $u_2$, $u_3$] to the first symbol sequence A=[$A_0$, $A_1$, $A_2$, $A_3$] is in Algorithm 1.

Algorithm 1 may relate to one of the specific implementation of the energy threshold encoding. This can include computing u into an integer $$I = \sum_{i=0}^{3} u_i \cdot 2^i$$

and set $I_0$=I.

For i=0, 1, 2, 3, the algorithm can include finding $A_i$ in the symbol set Φ={1, 3, 5} such that $$\sum_{a<A_i} T_i(A_0, A_1, A_{i-1}, a) \le I_i < \sum_{a \le A_i} T_i(A_0, A_1, A_{i-1}, a),$$

and if i<Na−1, compute $$I_{i+1} = I_i - \sum_{a<A_i} T_i(A_0, A_1, A_{i-1}, a),$$

output [$A_0$, $A_1$, $A_2$, $A_3$] as the first symbol sequence A.

Further, in a specific example of this embodiment, the minimum energy encoding may encode the first bit sequence u into the first symbol sequence A such that the $2^{Kd}$ possible output of the minimum energy encoding is the $2^{Kd}$ symbol sequences with the lowest sequence energy among all the $Ma^{Na}$ symbol sequences with each symbol chosen from the symbol set.

Table 8 may provide one of the specific implementation of the minimum energy encoding is that converting the first bit sequence u into an integer $$I = \sum_{i=0}^{Kd-1} u_i \cdot 2^i$$

such that the I-th minimum energy sequence is the output of the minimum energy encoding for the symbol set Φ={1,3}, Kd=3, Na=4.

TABLE 8

One of the specific implementation of the minimum energy encoding for Kd = 3 and Na = 4 for the symbol set Φ = {1, 3}

| the first bit sequence u = [$u_0$, $u_1$, $u_2$] | The first symbol sequence A = [$A_0$, $A_1$, $A_2$, $A_3$, $A_4$] |
|---|---|
| 000 | 1111 |
| 100 | 1113 |
| 010 | 1131 |
| 110 | 1311 |
| 001 | 3111 |
| 101 | 1133 |
| 011 | 1313 |
| 111 | 1331 |

Further, in a specific example of this embodiment, the variable-length encoding may include a variable-to-variable-length encoding or a fix-to-variable-length encoding, where a variable-to-variable-length may encode the first bit sequence u into the first symbol sequence using a one-to-one mapping between a first prefix-free code and a second prefix-free code. A fix-to-variable-length encoding may encode the first bit sequence u into the first symbol sequence using a one-to-one mapping between a first fix-length bit sequence set and a second prefix-free code. A prefix-free code may have the following two properties: (i) codewords have different lengths; (ii) any codeword is not the prefix of any other codewords such that if [$a_0$, $a_1$, . . . , $a_{n-1}$] is a codeword of length n, there is no any other codewords of the form [$a_0$, $a_1$, . . . , $a_{n-1}$, $b_0$, $b_1$, $b_{m-1}$] with m>0. The first prefix-free code is with bits as elements in a codeword. The second prefix-free code may be with symbols as elements in a codeword. One of the specific example of the first prefix-free code is {0, 10, 110, 111} with elements in codewords being bits. One of the specific example of the second prefix-free code is {1111, 1113, 33, 53} with elements in codewords chosen from the symbol set Φ={1, 3, 5}. One of the specific example of the variable-to-variable-length encoding is the one-to-one mapping between the prefix-free code {0, 10, 110, 111} and the prefix-free code {1111, 1113, 33, 53} as follows.

0→1111
10→1113
110→33
111→53

Table 9 may provide one of the specific example of the variable-to-variable-length encoding for the symbol set Φ={1, 3}. One of the specific example of the fix-to-variable-length is the one-to-one mapping between the fix-length bit sequence set {11, 10, 01} and the prefix-free code {1111, 1113, 33} as follows.

11→1111
10→1113
01→33

One of the specific example of the fix-to-variable-length is the one-to-one mapping between the fix-length bit sequence {11, 10, 01, 00} and the prefix-free code {1111, 1113, 33, 53} as follows.

11→1111
10→1113
01→33
00→53

TABLE 9

One of the specific example of the variable-to-variable-length encoding for the symbol set Φ = {1, 3}

| the first prefix-free code | the second prefix-free code |
|---|---|
| 0 | 111111 |
| 100 | 113 |
| 1010 | 111113 |
| 1011 | 11113 |
| 1100 | 1113 |
| 1101 | 1311 |
| 1110 | 3111 |
| 111100 | 133 |
| 111101 | 3113 |
| 1111100 | 1313 |
| 1111101 | 3131 |
| 1111110 | 3311 |
| 11111110 | 3133 |
| 111111110 | 3313 |
| 111111111 | 3331 |

Further, in a specific example of this embodiment, the non-linear coding can encode the first bit sequence into the first symbol sequence such that there exist at least three different first bit sequences $[u_{0,0}, u_{0,1}, \ldots, u_{0,Kd-1}]$, $[u_{1,0}, u_{1,1}, \ldots, u_{1,Kd-1}]$, and $[u_{2,0}, u_{2,1}, \ldots, u_{2,Kd-1}]$ and their corresponding output of the non-linear coding $[A_{0,0}, A_{0,1}, \ldots, A_{0,Na-1}]$, $[A_{1,0}, A_{1,1}, \ldots, A_{1,Na-1}]$, and $[A_{2,0}, A_{2,1}, \ldots, A_{2,Na-1}]$ fulfilling all the following properties. A first property may include $u_{2,i}=+u_{0,i}$ mod 2 for i=0, 1, 2, ..., Kd−1, where mod 2 is the modulo-2 operation. There may exist at least an integer i such that $A_{2,i} \neq +A_{0,i}$, mod 2, where mod 2 is the modulo-2 operation. There may exist at least an integer i such that $A_{2,i} \neq A_{1,i}+A_{0,i}$, where the addition is real addition.

Further, in a specific example of this embodiment, the pre-channel coding may include a non-linear coding such that there exist at least three different first bit sequences $[u_{0,0}, u_{0,1}, \ldots, u_{0,Kd-1}]$, $[u_{1,0}, u_{1,1}, \ldots, u_{1,Kd-1}]$, and $[u_{2,0}, u_{2,1}, \ldots, u_{2,Kd-1}]$ and their corresponding second bit sequences are $[v_{0,0}, v_{0,1}, v_{0,Nv-1}]$, $[v_{1,0}, v_{1,1}, v_{1,Nv-1}]$, and $[v_{2,0}, v_{2,1}, \ldots, v_{2,Nv-1}]$, respectively fulfilling all the following properties. A property may include $u_{2,1}=u_{1,i}+u_{0,i}$ mod 2 for i=0, 1, 2, ..., Kd−1, where mod 2 is the modulo-2 operation. There may exist at least an integer i such that $v_{2,i} \neq v_{1,i}+v_{0,i}$ mod 2, where mod 2 is the modulo-2 operation.

Further, in a specific example of this embodiment, the first bit sequence u can be divided into $C_p$ sub-sequences with each sub-sequence performing the pre-channel coding separately.

The labeling of the symbol set can have effect on the error correction performance of channel coding and modulation. If the input of the channel coding has more bit 1's, the output of the channel coding will have more bit 1's and have a better error correction performance. Thus, a symbol may appear more frequently in the output of the pre-channel coding should have a label with more bit 1's, i.e., a labeling with one of the following properties.

The label of the smallest symbol in the symbol set Φ has bit "1" more than the label of the largest symbol in the symbol set Φ. The all 1's labeling is corresponding to one of the constellation points with smallest power. The all 1's labeling is corresponding to the smallest symbol in the symbol set Φ.

Figure 2A:
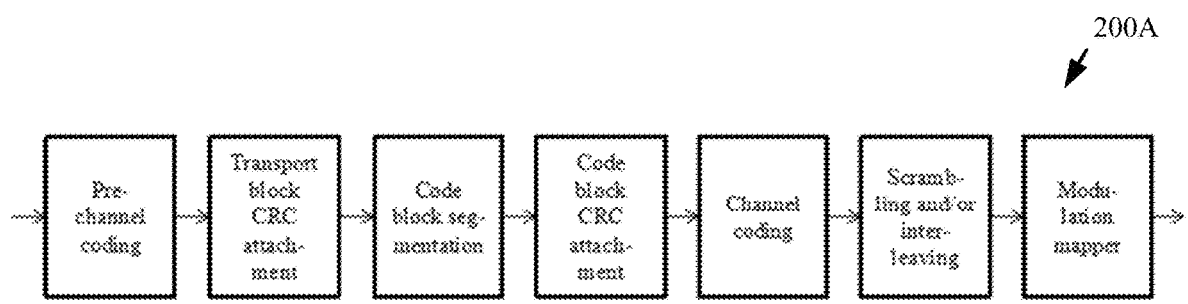
FIG. 2A provides a first example for the pre-channel coding before a transport block CRC attachment.
Figure 2B:
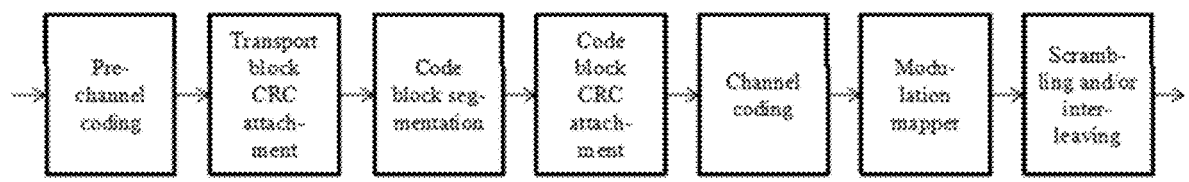
FIG. 2B provides a second example for the pre-channel coding before a transport block CRC attachment.

FIGS. 2A-2B provide examples 200A, 200B for the pre-channel coding before the transport block CRC attachment.

Example Embodiment 2

Example Embodiment 2 relates to pre-channel coding before a transport block CRC attachment. This embodiment may be obtained on the basis of the Embodiment 1.

In a specific example of this embodiment, the pre-channel coding is before the transport block CRC attachment. FIGS. 2A-2B provide two of the specific examples that can include at least one portion of the payload is the input of the pre-channel coding and/or both the output of the pre-channel coding and the bits excluding the at least one portion of the payload are the input of the transport block CRC attachment.

One of the benefits of the pre-channel coding before the transport block CRC attachment may be that if errors are detected by the CRC attached to the transport block, the decoding of the pre-channel coding is not needed which reduces receive complexity. Another benefit of the pre-channel coding before the transport block CRC attachment may be that the TBS is larger than that of the pre-channel coding after the transport block CRC attachment for a given number of resource elements.

FIGS. 3A-D provide examples 300A, 300B, 300C, 300D for the pre-channel coding after a transport block CRC attachment.

Example Embodiment 3

Example Embodiment 3 relates to a pre-channel coding is after a transport block CRC attachment. This embodiment may be obtained on the basis of the Embodiment 1.

In a specific example of this embodiment, the pre-channel coding is after the transport block CRC attachment. Further, in a specific example of this embodiment, FIG. 3A and FIG. 3B may provide two of the specific example that at least one portion of the output of the transport block CRC attachment is the input of the pre-channel coding, and both the output of the pre-channel coding and the output of the transport block CRC attachment excluding the at least one portion of the output of the transport block CRC attachment are the input of the code block segmentation, and the output of the code block segmentation is the input of the code block CRC attachment, and the output of the code block CRC attachment may be the input of the channel coding.

Figure 3A:
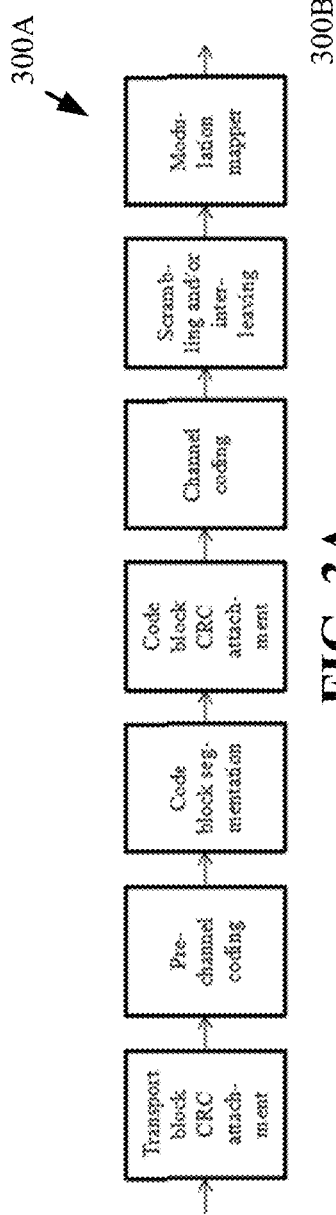
FIG. 3A provides a first example for the pre-channel coding is after a transport block CRC attachment.
Figure 3B:
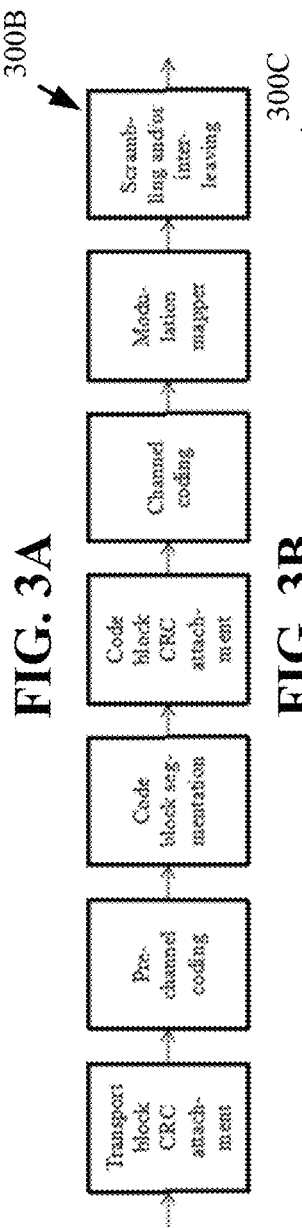
FIG. 3B provides a second example for the pre-channel coding is after a transport block CRC attachment.
Figure 3C:
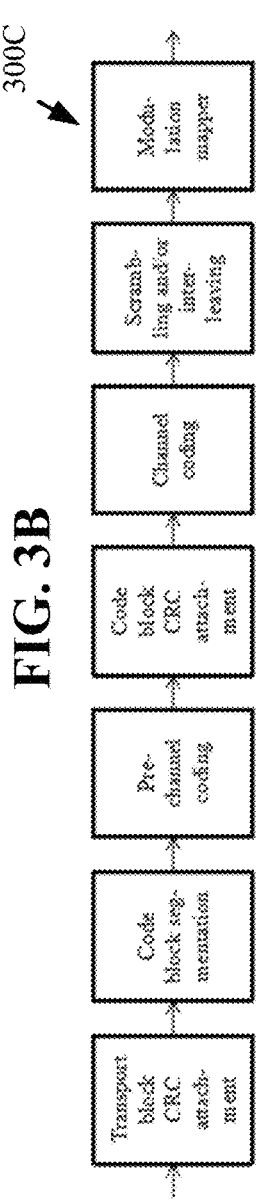
FIG. 3C provides a third example for the pre-channel coding is after a transport block CRC attachment.
Figure 3D:
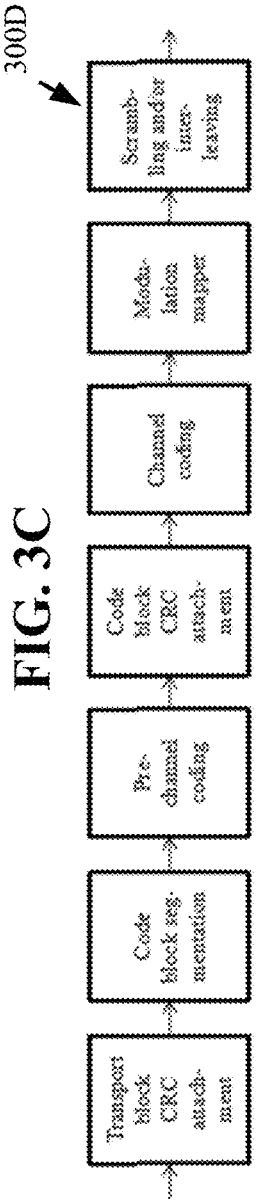
FIG. 3D provides a fourth example for the pre-channel coding is after a transport block CRC attachment.

Further, in a specific example of this embodiment, FIG. 3C and FIG. 3D may provide two of the specific example that the output of the transport block CRC attachment is the input of the code block segmentation, and at least one portion of the output of the code block segmentation is the input of the pre-channel coding, and both the output of the pre-channel coding and the output of the code block segmentation excluding the at least one portion of the output of the code block segmentation are the input of the code block CRC attachment, and the output of the code block CRC attachment may be the input of the channel coding.

Figures 4A, 4B:
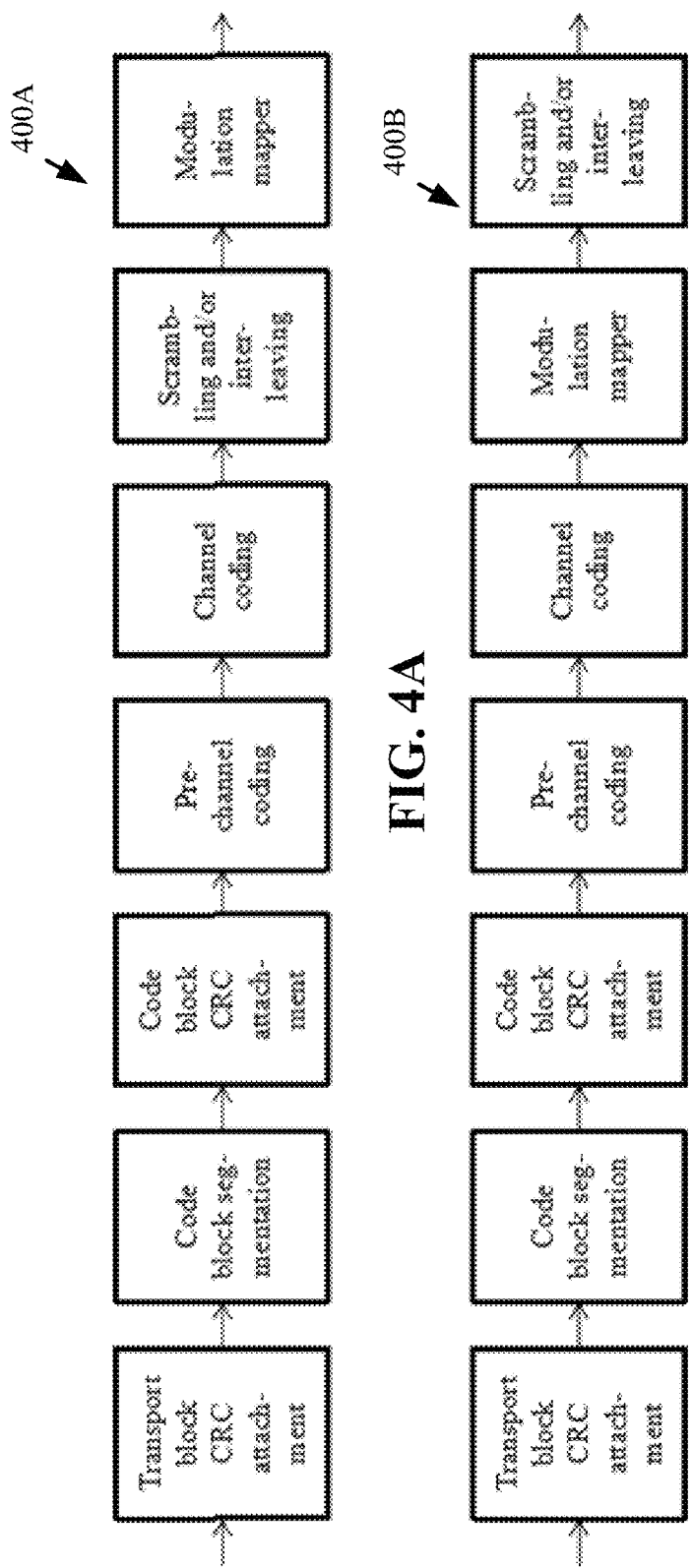
FIG. 4A provides a first example for the pre-channel coding after a code block CRC attachment.
FIG. 4B provides a second example for the pre-channel coding after a code block CRC attachment.

Further, in a specific example of this embodiment, FIGS. 4A-4B may give two of the specific example that the output of the transport block CRC attachment is the input of the code block segmentation, and the output of the code block segmentation is the input of the code block CRC attachment, and the at least one portion of the output of the code block CRC attachment is the input of the pre-channel coding.

Both the output of the pre-channel coding and the output of the code block CRC attachment excluding the at least one portion of the output of the code block CRC attachment may be the input of the channel coding.

One of the benefits of the pre-channel coding after the transport block CRC attachment may be that if errors are detected by the CRC attached to the code blocks, the decoding of the pre-channel coding is not needed which reduces receive complexity. Another benefit of the pre-channel coding after the transport block CRC attachment may be that the TBS is larger than that of the pre-channel coding after both the transport block CRC attachment and the code block CRC attachment for a given number of resource elements.

FIGS. 4A-4B provide examples 400A, 400B for the pre-channel coding after the code block CRC attachment.

Example Embodiment 4

Example Embodiment 4 relates to a pre-channel coding is after a code block CRC attachment. This embodiment may be obtained on the basis of the Embodiment 1. In a specific example of this embodiment, the pre-channel coding is after the code block CRC attachment.

FIG. 4A-4B may provide specific examples that the output of the transport block CRC attachment is the input of the code block segmentation, and the output of the code block segmentation is the input of the code block CRC attachment, and at least one portion of the output of the code block CRC attachment is the input of the pre-channel coding.

Both the output of the pre-channel coding and the output of the code block CRC attachment excluding the at least one portion of the output of the code block CRC attachment may be the input of the channel coding.

One of the benefits of the pre-channel coding after the code block CRC attachment may be that the error correction compatibility of the pre-channel coding can be utilized when the transport block is received.

Example Embodiment 5

Example Embodiment 5 relates to the output of the channel coding. This embodiment may be obtained on the basis of one of the above embodiments.

In a specific example of this embodiment, the output of the channel coding comprises two parts: a first part of the output of the channel coding, denoted as $c_1$, is the output of the symbol-to-bit conversion of the pre-channel coding, i.e., the second bit sequence v; a second part of the output of the channel coding, denoted as $c_2$, is the output of the channel coding excluding the first part of the output of the channel coding.

Further, in a specific example of this embodiment, if $c=[c_0, c_1, c_2, c_{N-1}]$ is the output of the channel coding, the first part of the output of the channel coding $c_1$ can be $[c_{K0}, c_{K0+1}, c_{K0+2}, \ldots, c_{K1-1}]$, and the second part the output of the channel coding $c_2$ can be $[c_0, c_1, \ldots, c_{K0-1}, c_{K1}, c_{K1+1}, \ldots, c_{N-1}]$, where $0 \leq K0 \leq K1 \leq N$ and N is the length of the output of the channel coding.

Further, in a specific example of this embodiment, the second part of the output of the channel coding comprises the parity bits computed by the channel coding.

Further, in a specific example of this embodiment, the second part of the output of the channel coding further comprises at least one of the following: The bits input to the channel coding excluding the output of the symbol-to-bit conversion of the pre-channel coding, CRC parity bits computed by the code block CRC attachment, CRC parity bits computed by the transport block CRC attachment.

Example Embodiment 6

Example Embodiment 6 relates to at least one portion of the output of the channel coding is interleaved for MQAM. This embodiment may be obtained on the basis of Example Embodiment 5.

In this embodiment, channel coding and modulation for the transport block further comprises a modulation mapper, where the modulation order of the modulation mapper is Qm.

Further, in a specific example of this embodiment, the constellation of the modulation mapper includes an MQAM constellation.

Further, in a specific example of this embodiment, the at least one portion of the output of the channel coding is interleaved into an interleaved channel coding sequence w with every consecutive Qm bits of the interleaved channel coding sequence w being a label for the modulation mapper by putting together the following three parts into Qm consecutive bits of the interleaved channel coding sequence w.

Every Qm/2-1 bits in the first part of the output of the channel coding being a label of a symbol from the bit-to-symbol encoding. Every Qm/2-1 bits in the first part of the output of the channel coding being another label of another symbol from the bit-to-symbol encoding;

Every 2 bits in at least one portion of the second part of the output of the channel coding.

Table 10(a) may provide one of the specific implementations as follows.

| | | |
|---|---|---|
| $w_{i \cdot Qm}$ | $= c_{2,2i}$ | for $i = 0, 1, 2, \ldots, Na/2 - 1$ |
| $w_{i \cdot Qm+1}$ | $= c_{2,2i+1}$ | for $i = 0, 1, 2, \ldots, Na/2 - 1$ |
| $w_{i \cdot Qm+2 \cdot j}$ | $= c_{1,2i \cdot Qa+j-1}$ | for $i = 0, 1, 2, \ldots, Na/2 - 1$ and $j = 1, 2, \ldots, Qa$ |
| $w_{i \cdot Qm+2 \cdot j+1}$ | $= c_{1,(2i+1) \cdot Qa+j-1}$ | for $i = 0, 1, 2, \ldots, Na/2 - 1$ and $j = 1, 2, \ldots, Qa$ |

Table 10(b) may provide one of the specific implementations as follows.

| | | |
|---|---|---|
| $w_{i \cdot Qm}$ | $= c_{2,2i}$ | for $i = 0, 1, 2, \ldots, Na/2 - 1$ |
| $w_{i \cdot Qm+1}$ | $= c_{2,2i+1}$ | for $i = 0, 1, 2, \ldots, Na/2 - 1$ |
| $w_{i \cdot Qm+2 \cdot j}$ | $= c_{1,(2i+1) \cdot Qa+j-1}$ | for $i = 0, 1, 2, \ldots, Na/2 - 1$ and $j = 1, 2, \ldots, Qa$ |
| $w_{i \cdot Qm+2 \cdot j+1}$ | $= c_{1,2i \cdot Qa+j-1}$ | for $i = 0, 1, 2, \ldots, Na/2 - 1$ and $j = 1, 2, \ldots, Qa$ |

Table 10(c) may provide one of the specific implementations as follows.

| | | |
|---|---|---|
| $w_{i \cdot Qm+2 \cdot j}$ | $= c_{1,2i \cdot Qa+j}$ | for $i = 0, 1, 2, \ldots, Na/2 - 1$ and $j = 1, 2, \ldots, Qa - 1$ |
| $w_{i \cdot Qm+2 \cdot j+1}$ | $= c_{1,(2i+1) \cdot Qa+j}$ | for $i = 0, 1, 2, \ldots, Na/2 - 1$ and $j = 1, 2, \ldots, Qa - 1$ |
| $w_{i \cdot Qm+2Qa}$ | $= c_{2,2i}$ | for $i = 0, 1, 2, \ldots, Na/2 - 1$ |
| $w_{i \cdot Qm+2Qa+1}$ | $= c_{2,2i+1}$ | for $i = 0, 1, 2, \ldots, Na/2 - 1$ |

Table 10(d) may provide one of the specific implementations as follows.

| | | |
|---|---|---|
| $w_{i \cdot Qm+2 \cdot j}$ | $= c_{1,(2i+1) \cdot Qa+j}$ | for $i = 0, 1, 2, \ldots, Na/2 - 1$ and $j = 1, 2, \ldots, Qa - 1$ |
| $w_{i \cdot Qm+2 \cdot j+1}$ | $= c_{1,2i \cdot Qa+j}$ | for $i = 0, 1, 2, \ldots, Na/2 - 1$ and $j = 1, 2, \ldots, Qa - 1$ |
| $w_{i \cdot Qm+2Qa}$ | $= c_{2,2i}$ | for $i = 0, 1, 2, \ldots, Na/2 - 1$ |
| $w_{i \cdot Qm+2Qa+1}$ | $= c_{2,2i+1}$ | for $i = 0, 1, 2, \ldots, Na/2 - 1$ |

Further, in a specific example of this embodiment, Tables 10(a)-10(d) may provide one of the specific implementations that $Qa = Qm/2 - 1$ may be the length of the label of the symbol set, $(c_{1,2i \cdot Qa}, c_{1,2i \cdot Qa+1}, \ldots, c_{1,2i \cdot Qa+Qa-1})$ may be the label of the symbol $A_{2i}$ in the first symbol sequence A, $(c_{1,(2i+1) \cdot Qa}, c_{1,(2i+1) \cdot Qa+1}, \ldots, c_{1,(2i+1) \cdot Qa+Qa-1})$ may be the label of the symbol $A_{2i+1}$ in the first symbol sequence A and Na may be the length of the first symbol sequence A.

TABLE 10

Examples for interleaving the output of the channel coding for Qm = 6, Qa = 2, and Na = 8.

| | | | | | | | | |
|---|---|---|---|---|---|---|---|---|
| $c_{2,0}$ | $c_{2,2}$ | $c_{2,4}$ | $c_{2,6}$ | → | $w_0$ | $w_6$ | $w_{12}$ | $w_{18}$ |
| $c_{2,1}$ | $c_{2,3}$ | $c_{2,5}$ | $c_{2,7}$ | (a) | $w_1$ | $w_7$ | $w_{13}$ | $w_{19}$ |
| $c_{1,0}$ | $c_{1,4}$ | $c_{1,8}$ | $c_{1,12}$ | | $w_2$ | $w_8$ | $w_{14}$ | $w_{20}$ |
| $c_{1,2}$ | $c_{1,6}$ | $c_{1,10}$ | $c_{1,14}$ | | $w_3$ | $w_9$ | $w_{15}$ | $w_{21}$ |
| $c_{1,1}$ | $c_{1,5}$ | $c_{1,9}$ | $c_{1,13}$ | | $w_4$ | $w_{10}$ | $w_{16}$ | $w_{22}$ |
| $c_{1,3}$ | $c_{1,7}$ | $c_{1,11}$ | $c_{1,15}$ | | $w_5$ | $w_{11}$ | $w_{17}$ | $w_{23}$ |
| $c_{2,0}$ | $c_{2,2}$ | $c_{2,4}$ | $c_{2,6}$ | → | $w_0$ | $w_6$ | $w_{12}$ | $w_{18}$ |
| $c_{2,1}$ | $c_{2,3}$ | $c_{2,5}$ | $c_{2,7}$ | (b) | $w_1$ | $w_7$ | $w_{13}$ | $w_{19}$ |
| $c_{1,2}$ | $c_{1,6}$ | $c_{1,10}$ | $c_{1,14}$ | | $w_2$ | $w_8$ | $w_{14}$ | $w_{20}$ |
| $c_{1,0}$ | $c_{1,4}$ | $c_{1,8}$ | $c_{1,12}$ | | $w_3$ | $w_9$ | $w_{15}$ | $w_{21}$ |
| $c_{1,3}$ | $c_{1,7}$ | $c_{1,11}$ | $c_{1,15}$ | | $w_4$ | $w_{10}$ | $w_{16}$ | $w_{22}$ |
| $c_{1,1}$ | $c_{1,5}$ | $c_{1,9}$ | $c_{1,13}$ | | $w_5$ | $w_{11}$ | $w_{17}$ | $w_{23}$ |
| $c_{1,0}$ | $c_{1,4}$ | $c_{1,8}$ | $c_{1,12}$ | → | $w_0$ | $w_6$ | $w_{12}$ | $w_{18}$ |
| $c_{1,2}$ | $c_{1,6}$ | $c_{1,10}$ | $c_{1,14}$ | (c) | $w_1$ | $w_7$ | $w_{13}$ | $w_{19}$ |
| $c_{1,1}$ | $c_{1,5}$ | $c_{1,9}$ | $c_{1,13}$ | | $w_2$ | $w_8$ | $w_{14}$ | $w_{20}$ |
| $c_{1,3}$ | $c_{1,7}$ | $c_{1,11}$ | $c_{1,15}$ | | $w_3$ | $w_9$ | $w_{15}$ | $w_{21}$ |
| $c_{2,0}$ | $c_{2,2}$ | $c_{2,4}$ | $c_{2,6}$ | | $w_4$ | $w_{10}$ | $w_{16}$ | $w_{22}$ |
| $c_{2,1}$ | $c_{2,3}$ | $c_{2,5}$ | $c_{2,7}$ | | $w_5$ | $w_{11}$ | $w_{17}$ | $w_{23}$ |
| $c_{1,2}$ | $c_{1,6}$ | $c_{1,10}$ | $c_{1,14}$ | → | $w_0$ | $w_6$ | $w_{12}$ | $w_{18}$ |
| $c_{1,0}$ | $c_{1,4}$ | $c_{1,8}$ | $c_{1,12}$ | (d) | $w_1$ | $w_7$ | $w_{13}$ | $w_{19}$ |
| $c_{1,3}$ | $c_{1,7}$ | $c_{1,11}$ | $c_{1,15}$ | | $w_2$ | $w_8$ | $w_{14}$ | $w_{20}$ |
| $c_{1,1}$ | $c_{1,5}$ | $c_{1,9}$ | $c_{1,13}$ | | $w_3$ | $w_9$ | $w_{15}$ | $w_{21}$ |
| $c_{2,0}$ | $c_{2,2}$ | $c_{2,4}$ | $c_{2,6}$ | | $w_4$ | $w_{10}$ | $w_{16}$ | $w_{22}$ |
| $c_{2,1}$ | $c_{2,3}$ | $c_{2,5}$ | $c_{2,7}$ | | $w_5$ | $w_{11}$ | $w_{17}$ | $w_{23}$ |

Example Embodiment 7

Example Embodiment 7 relates to at least one portion of the output of the channel coding is interleaved for all kinds of constellations, may include MQAM. This embodiment may be obtained on the basis of Example Embodiment 5. In this embodiment, channel coding and modulation for the transport block further comprises a modulation mapper, where the modulation order of the modulation mapper is Qm.

In a specific example of this embodiment, at least one portion of the output of the channel coding is interleaved into an interleaved channel coding sequence w with every consecutive Qm bits of the interleaved channel coding sequence w forming a label for the modulation mapper by putting together the following two parts into Qm consecutive bits of the interleaved channel coding sequence w: Every Qa bits in the first part of the output of the channel coding being a label of a symbol from the bit-to-symbol encoding and every Qm-Qa bits in at least one portion of the second part of the output of the channel coding, wherein Qa may be the length of the labeling of the symbol set and Qm is the modulation order of the modulation mapper. Table 11(a) may provide one of the specific implementations as follows.

$w_{i \cdot Qm+j} = c_{1, i \cdot Qa+j}$ for $i = 0, 1, 2, \ldots, Na - 1$ and $j = 0, 1, \ldots, Qa - 1$
$w_{i \cdot Qm+Qa+j} = c_{2, i \cdot (Qm-Qa)+j}$ for $i = 0, 1, 2, \ldots, Na - 1$ and $j = 0, 1, \ldots, Qm - Qa - 1$, Table 11(b) gives one of the specific implementations as follows.

$w_{i \cdot Qm+j} = c_{2, i \cdot (Qm-Qa)+j}$ for $i = 0, 1, 2, \ldots, Na - 1$ and $j = 0, 1, \ldots, Qm - Qa - 1$,
$w_{i \cdot Qm+(Qm-Qa)+j} = c_{1, i \cdot Qa+j}$ for $i = 0, 1, 2, \ldots, Na - 1$ and $j = 0, 1, \ldots, Qa - 1$, Tables 11(a)-(b) may provide one of the specific implementations that $(c_{1, i \cdot Qa}, c_{1, i \cdot Qa+1}, \ldots, c_{1, i \cdot Qa+Qa-1})$ may be the label of the symbol $A_i$ in the first symbol sequence A and Na may be the length of the first symbol sequence A.

TABLE 11

Examples for interleaving the output of the channel coding for Qm = 5, Qa = 3, and Na = 4.

| $c_{1,0}$ | $c_{1,3}$ | $c_{1,6}$ | $c_{1,9}$ | → | $w_0$ | $w_5$ | $w_{10}$ | $w_{15}$ |
|---|---|---|---|---|---|---|---|---|
| $c_{1,1}$ | $c_{1,4}$ | $c_{1,7}$ | $c_{1,10}$ | (a) | $w_1$ | $w_6$ | $w_{11}$ | $w_{16}$ |
| $c_{1,2}$ | $c_{1,5}$ | $c_{1,8}$ | $c_{1,11}$ | | $w_2$ | $w_7$ | $w_{12}$ | $w_{17}$ |
| $c_{2,0}$ | $c_{2,2}$ | $c_{2,4}$ | $c_{2,6}$ | | $w_3$ | $w_8$ | $w_{13}$ | $w_{18}$ |
| $c_{2,1}$ | $c_{2,3}$ | $c_{2,5}$ | $c_{2,7}$ | | $w_4$ | $w_9$ | $w_{14}$ | $w_{19}$ |
| $c_{2,0}$ | $c_{2,2}$ | $c_{2,4}$ | $c_{2,6}$ | → | $w_0$ | $w_5$ | $w_{10}$ | $w_{15}$ |
| $c_{2,1}$ | $c_{2,3}$ | $c_{2,5}$ | $c_{2,7}$ | (b) | $w_1$ | $w_6$ | $w_{11}$ | $w_{16}$ |
| $c_{1,0}$ | $c_{1,3}$ | $c_{1,6}$ | $c_{1,9}$ | | $w_2$ | $w_7$ | $w_{12}$ | $w_{17}$ |
| $c_{1,1}$ | $c_{1,4}$ | $c_{1,7}$ | $c_{1,10}$ | | $w_3$ | $w_8$ | $w_{13}$ | $w_{18}$ |
| $c_{1,2}$ | $c_{1,5}$ | $c_{1,8}$ | $c_{1,11}$ | | $w_4$ | $w_9$ | $w_{14}$ | $w_{19}$ |

Example Embodiment 8

Example Embodiment 8 relates to a scrambling and/or interleaving is after the modulation mapper. This embodiment may be obtained on the basis of one of the above example embodiments. In this embodiment, channel coding and modulation for the transport block further comprises the scrambling and/or interleaving.

In a specific example of this embodiment, the scrambling and/or interleaving is after the modulation mapper. FIGS. 2B, 3B, 3D and 4B may provide specific examples that the output of the modulation mapper is the input of the scrambling and/or interleaving. In a specific example of this embodiment, the modulation mapper takes as input every Qm consecutive bits of the interleaved channel coding sequence $w=[w_0, w_1, w_2, \ldots, w_{Nx-1}]$, maps the Qm consecutive bits into a modulation symbol according to the labeling of the constellation of the modulation mapper, and outputs a modulation symbol sequence $x=[x_0, x_1, x_2, \ldots, x_{Nx-1}]$. One of the specific implementation is that the label of the i-th modulation symbol in the modulation symbol sequence $x_i$ is $(w_{i \cdot Qm}, w_{i \cdot Qm+1}, w_{i \cdot Qm+2}, \ldots, w_{i \cdot Qm+Qm-1})$ for $i=0, 1, 2, \ldots, Nx-1$ with $Nw=Qm \cdot Nx$, wherein Nx is the length of the modulation symbol sequence x, Nw is the length of the interleaved channel coding sequence w and Qm is the modulation order of the modulation mapper.

In a specific example of this embodiment, the modulation symbol sequence x is the input of the scrambling and/or interleaving.

Example Embodiment 9

Example Embodiment 9 relates to the modulation mapper and phase rotation. This embodiment may be obtained on the basis of one of the above example embodiments.

In a specific example of this embodiment, the scrambling and/or interleaving is a modulation symbol scrambling has the following properties and operations that may not change complex-modulus of modulation symbols, perform an element-by-element phase rotation on the modulation symbol sequence $x=[x_0, x_1, x_2, \ldots, x_{Nx-1}]$ according to a complex-value sequence g known to both the first node and the second node, and output a scrambled modulation symbol sequence $z=[z_0, z_1, z_2, \ldots, z_{Nx-1}]$, wherein Nx may be the length of both the modulation symbol sequence x and the scrambled modulation symbol sequence z.

Further, in a specific example of this embodiment, one of the specific implementation of the element-by-element phase rotation is the complex multiplication between the modulation symbol sequence x and the complex-value sequence g with each element in the complex-value sequence g being a value from a unit-modulus complex value set $\Psi=\{\psi_0, \psi_1, \ldots, \psi_{Mb-1}\}$ of $2^m$ elements, where $Mb=2^m$ and $m>0$.

Further, in a specific example of this embodiment, one of the specific implementation of the unit-modulus complex value set is one of the following: the unit-modulus complex value set $\Psi=\{+1, -1, +j, -j\}$, the unit-modulus complex value set $\Psi=\{+1, -1\}$, the unit-modulus complex value set $\Psi=\{-1, +j, -j\}$, the unit-modulus complex value set $$\Psi = \left\{ \frac{1}{\sqrt{2}} + j \cdot \frac{1}{\sqrt{2}}, \frac{-1}{\sqrt{2}} + j \cdot \frac{1}{\sqrt{2}}, \frac{1}{\sqrt{2}} - j \cdot \frac{1}{\sqrt{2}}, \frac{-1}{\sqrt{2}} - j \cdot \frac{1}{\sqrt{2}} \right\},$$

where $j=\sqrt{-1}$ is the imaginary unit.

Further, in a specific example of this embodiment, the element-by-element phase rotation on the modulation symbol sequence x into the scrambled modulation symbol sequence z by determining each $g_i$ from the unit-modulus complex value set $\Psi$ as follows:

$z_i=x_i \cdot g_i$ for $i=0,1,2,\ldots,Nx-1$, $g_i=\psi_n$ for $i=0,1,2,\ldots,Nx-1$, $n=k_{i\cdot m}+2\cdot k_{i\cdot m+1}+2^2\cdot k_{i\cdot m+2}+2^3\cdot k_{i\cdot m+3}+\ldots+2^{m-1}\cdot k_{i\cdot m+m-1}$, $k=[k_0, k_1, k_2, \ldots, k_{m\cdot Nx-1}]$ is a pseudo-random bit sequence generated by a pseudo-random sequence generator and $Ng \geq Nx$.

Further, in a specific example of this embodiment, one of the specific implementation is that each element of the complex-value sequence $g=[g_0, g_1, g_2, \ldots, g_{Ng-1}]$ is 0 or 1 and the element-by-element phase rotation on the modulation symbol sequence x into the scrambled modulation symbol sequence z is one of the following.

$$z_i = x_i \cdot \left(\frac{1-2g_{2i}}{\sqrt{2}} + j \cdot \frac{1-2g_{2i+1}}{\sqrt{2}}\right) \text{ for } i = 0, 1, 2, \ldots, Nx-1,$$

$$z_i = x_i \cdot \left(\frac{2g_{2i}-1}{\sqrt{2}} + j \cdot \frac{2g_{2i+1}-1}{\sqrt{2}}\right) \text{ for } i = 0, 1, 2, \ldots, Nx-1, \quad (1)$$

$$z_i = x_i \cdot (1-2g_{2i}) \cdot j^{g_{2i+1}} \text{ for } i = 0, 1, 2, \ldots, Nx-1, \quad (2)$$

$$z_i = x_i \cdot (2g_{2i}-1) \cdot j^{g_{2i+1}} \text{ for } i = 0, 1, 2, \ldots, Nx-1, \quad (3)$$

$$z_i = x_i \cdot (1-2g_{2i+1}) \cdot j^{g_{2i}} \text{ for } i = 0, 1, 2, \ldots, Nx-1, \quad (4)$$

$$z_i = x_i \cdot (2g_{2i+1}-1) \cdot j^{g_{2i}} \text{ for } i = 0, 1, 2, \ldots, Nx-1, \quad (5)$$

$$z_i = x_i \cdot (1-2g_{2i}) \cdot j^{1-g_{2i+1}} \text{ for } i = 0, 1, 2, \ldots, Nx-1, \quad (6)$$

$$z_i = x_i \cdot (2g_{2i}-1) \cdot j^{1-g_{2i+1}} \text{ for } i = 0, 1, 2, \ldots, Nx-1, \quad (7)$$

$$z_i = x_i \cdot (1-2g_{2i+1}) \cdot j^{1-g_{2i}} \text{ for } i = 0, 1, 2, \ldots, Nx-1, \quad (8)$$

$$z_i = x_i \cdot (2g_{2i+1}-1) \cdot j^{1-g_{2i}} \text{ for } i = 0, 1, 2, \ldots, Nx-1, \quad (9)$$

(10) $j=\sqrt{-1}$ is the imaginary unit, Nx may be the length of the modulation symbol sequence x, the complex-value sequence $g=[g_0, g_1, g_2, \ldots, g_{Ng-1}]$ can be a pseudo-random bit sequence generated by a pseudo-random sequence generator and $Ng \geq 2Nx$.

Further, in a specific example of this embodiment, one of the specific implementation is that each element of the complex-value sequence $g=[g_0, g_1, g_2, \ldots, g_{Ng-1}]$ can be 0 or 1 and the element-by-element phase rotation on the modulation symbol sequence x into the scrambled modulation symbol sequence z is one of the following.

$z_i=x_i(2g_i-1)$ for $i=0,1,2,\ldots,Nx-1$, (11)

$z_i=x_i(1-2g_i)$ for $i=0,1,2,\ldots,Nx-1$, (12)

$z_i=x_i(2g_i-1)\cdot j$ for $i=0,1,2,\ldots,Nx-1$, (13)

$z_i=x_i(1-2g_i)\cdot j$ for $i=0,1,2,\ldots,Nx-1$, (14)

$j=\sqrt{-1}$ is the imaginary unit, Nx may be the length of the modulation symbol sequence x, the complex-value sequence $g=[g_0, g_1, g_2, \ldots, g_{Ng-1}]$ can be a pseudo-random bit sequence generated by a pseudo-random sequence generator and $Ng \geq Nx$.

Further, in a specific example of this embodiment, one of the specific implementation is that each element of the complex-value sequence g is a value from a real value set $\Theta=\{\theta_0, \theta_1, \ldots, \theta_{L-1}\}$ of $2^m$ elements, where $L=2^m$ and $m>0$. The element-by-element phase rotation on the modulation symbol sequence x into the scrambled modulation symbol sequence z is as follows:

$z_i=x_i\cdot\exp(j\cdot g_i)$ for $i=0,1,2,\ldots,Nx-1$, $g_i=\theta_n$ for $i=0,1,2,\ldots,Nx-1$, $n=k_{i\cdot m}+2\cdot k_{i\cdot m+1}+2^2\cdot k_{i\cdot m+2}+2^3\cdot k_{i\cdot m+3}+\ldots+2^{m-1}\cdot k_{i\cdot m+m-1}$, $k=[k_0, k_1, k_2, \ldots, k_{m\cdot Nx-1}]$ is a pseudo-random bit sequence generated by a pseudo-random sequence generator and $Ng \geq Nx$.

Further, in a specific example of this embodiment, the real value set $\Theta$ may be one of the following: the set $\{0, \pi/2, \pi, 3\pi/2\}$, the set $\{0, \pi\}$, a subset of the set $\{0, \pi/2, \pi, 3\pi/2, 2\pi\}$.

Further, in a specific example of this embodiment, one of the specific implementation is that each element of the complex-value sequence $g=[g_0, g_1, g_2, g_{Ng-1}]$ can be 0 or 1 and the element-by-element phase rotation on the modulation symbol sequence x into the scrambled modulation symbol sequence z is one of the following:

$z_i=x_i\cdot\exp(j\cdot\delta_i)$ for $i=0,1,2,\ldots,Nx-1$, $\delta_i=2\pi\cdot(g_{i\cdot m}+2\cdot g_{i\cdot m+1}+2^2\cdot g_{i\cdot m+2}+2^3\cdot g_{i\cdot m+3}+\ldots+2^{m-1}\cdot g_{i\cdot m+m-1})/(2^m)$ for $i=0,1,2,\ldots,Nx-1$, $m>0$, $Ns \geq m\cdot Nx$, the complex-value sequence $g=[g_0, g_1, g_2, \ldots, g_{Ng-1}]$ can be a pseudo-random bit sequence generated by a pseudo-random sequence generator and $Ng \geq m\cdot Nx$.

In a specific example of this embodiment, the scrambling and/or interleaving is a modulation symbol scrambling element-by-element modifies the phase of each modulation symbol in the modulation symbol sequence $x=[x_0, x_1, x_2, \ldots, x_{Nx-1}]$ according to a phase rotation angle, wherein the phase rotation angle for each modulation symbol includes a value from a set of phase rotation angles $\Omega$ and wherein the modification of the phase of the modulation symbols does not modify a power of a constellation point. One of the specific implementations can be that the phase rotation angle of each modulation symbol in the modulation symbol sequence x is determined from the set of phase rotation angles $\Omega$. One of the specific implementations can be that the set of phase rotation angles $\Omega$ includes any of 90 degrees, 180 degrees, 270 degrees, and 360 degrees. One of the specific implementations can be that the set of phase rotation angles $\Omega$ includes a subset of the set including 0 degrees, 90 degrees, 180 degrees, 270 degrees, and 360 degrees.

The scrambled modulation symbol sequence z may be the output of the channel coding and modulation scheme.

The phase rotation can be applied to constellations of any type and any modulation order and multiplying a modulation symbol by a unit-modulus complex-value do not change the power of a modulation symbol, thus perverse the probability distribution of constellation points. The output of the phase rotation using a subset of the complex value set $\{+1, -1, +j, -j\}$ is still the constellation points in an MQAM constellation and can be applied to modulation mapper of any constellation and any modulation order. The output of the phase rotation using the set of phase rotation angles $\Omega$ can include a subset of the set including 0 degrees, 90 degrees, 180 degrees, 270 degrees, and 360 degrees is still the constellation points in an MQAM constellation and can be applied to modulation mapper of any constellation and any modulation order.

Example Embodiment 10

Example Embodiment 10 may relate to interleaving after the modulation mapper. This embodiment may be obtained on the basis of one of the above example embodiments. In this embodiment, the scrambling and/or interleaving is an interleaving to permute modulation symbols in the modulation symbol sequence $x=[x_0, x_1, x_2, \ldots, x_{Nx-1}]$ and output an interleaved modulation symbol sequence $z=[z_0, z_1, z_2, \ldots, z_{Nx-1}]$, wherein Nx is the length of both the modulation symbol sequence x and the interleaved modulation symbol sequence z.

Example Embodiment 11

Example Embodiment 11 may relate to swap interleaving after the modulation mapper. This embodiment may be obtained on the basis of one of the above example embodiments. In a specific example of this embodiment, the scrambling and/or interleaving is an interleaving to permute two neighboring modulation symbols in the modulation symbol sequence $x=[x_0, x_1, x_2, \ldots, x_{Nx-1}]$ according to a fourth bit sequence $s=[s(0), s(1), s(2), \ldots, s(Ns-1)]$ known to both the first node and the second node and output an interleaved modulation symbol sequence $z=[z_0, z_1, z_2, \ldots, z_{Nx-1}]$ according to one of the following: s(i)=1, two neighboring modulation symbols are swapped; otherwise, the two neighboring modulation symbols are not swapped, or s(i)=0, two neighboring modulation symbols are swapped; otherwise, the two neighboring modulation symbols are not swapped.

One of the specific implemented is as follows:

$z_{2i}=x_{2i+s(i)}$ for $i=0,1,2,\ldots,Nx/2-1$, $z_{2i+1}=x_{2i+1-s(i)}$ for $i=0,1,2,\ldots,Nx/2-1$.

s(i)=1, the two neighboring modulation symbols may be swapped; otherwise, the two neighboring modulation symbols are not swapped and Ns≥Nx/2.

One of the specific implemented is as follows:

$z_{2i}=x_{2i+1-s(i)}$ for $i=0,1,2,\ldots,Nx/2-1$, $z_{2i+1}=x_{2i+s(i)}$ for $i=0,1,2,\ldots,Nx/2-1$, s(i)=0, the two neighboring modulation symbols are swapped; otherwise, the two neighboring modulation symbols are not swapped and Ns≥Nx/2.

One of the specific implemented is as follows:

$z_{2i}=x_{2i+s(2i)}$ for $i=0,1,2,\ldots,Nx/2-1$, $z_{2i+1}=x_{2i+1-(2i)}$ for $i=0,1,2,\ldots,Nx/2-1$, s(2i)=1, the two neighboring modulation symbols are swapped; otherwise, the two neighboring modulation symbols are not swapped and Ns≥Nx.

One of the specific implemented is as follows:

$z_{2i}=x_{2i+1-s(2i)}$ for $i=0,1,2,\ldots,Nx/2-1$, $z_{2i+1}=x_{2i+s(2i)}$ for $i=0,1,2,\ldots,Nx/2-1$, s(2i)=0, the two neighboring modulation symbols are swapped; otherwise, the two neighboring modulation symbols are not swapped and Ns≥Nx.

One of the specific implemented is as follows:

$z_i=x_{i+(1-2(i \bmod 2))-s(\lfloor i/2 \rfloor)}$ for $i=0,1,2,\ldots,Nx-1$, $s(\lfloor i/2 \rfloor)=1$, the two neighboring modulation symbols are swapped; otherwise, the two neighboring modulation symbols are not swapped and Ns≥Nx.

One of the specific implemented is as follows:

$z_i=x_{i+(1-2(i \bmod 2))-(1-s(\lfloor i/2 \rfloor))}$ for $i=0,1,2,\ldots,Nx-1$, $s(\lfloor i/2 \rfloor)=0$, the two neighboring modulation symbols are swapped; otherwise, the two neighboring modulation symbols are not swapped and Ns≥Nx.

One of the specific implemented is that the fourth bit sequence $s=[s(0), s(1), s(2), \ldots, s(Ns-1)]$ is a pseudo-random bit sequence generated by a pseudo-random sequence generator.

The interleaved modulation symbol sequence z may be the output of the channel coding and modulation scheme.

Example Embodiment 12

Example Embodiment 12 relates to shift interleaving after the modulation mapper. This embodiment may be obtained on the basis of one of the above example embodiments.

In a specific example of this embodiment, the scrambling and/or interleaving is an interleaving to cyclic shift the modulation symbol sequence $x=[x_0, x_1, x_2, \ldots, x_{Nx-1}]$ into a shifted modulation symbol sequence $z=[z_0, z_1, z_2, \ldots, z_{Nx-1}]$ according to a first integer $L_s$ known to both the first node and the second node by one of the following.

Cyclic shift the modulation symbol sequence x to the left by $L_s$ modulation symbols into the shifted modulation symbol sequence z.

Cyclic shift the modulation symbol sequence x to the right by $L_s$ modulation symbols into the shifted modulation symbol sequence z.

One of the specific implementations can be as follows.

$z_i=x_{k(i)}$ for $i=0,1,2,\ldots,Nx-1$, $k(i)=i+L_s \bmod Nx$ for $i=0,1,2,\ldots,Nx-1$, The first integer $L_s$ is determined according to the high layer parameters. If $L_s>0$, the cyclic shift is a left cyclic shift. If $L_s<0$, the cyclic shift is a right cyclic shift. If $L_s=0$, there is no shift.

One example specific implementation is as follows.

$z_{k(i)}=x_i$ for $i=0,1,2,\ldots,Nx-1$, $k(i)=i+L_s \bmod Nx$ for $i=0,1,2,\ldots,Nx-1$, The first integer $L_s$ is determined according to the high layer parameters. If $L_s>0$, the cyclic shift is a right cyclic shift. If $L_s<0$, the cyclic shift is a left cyclic shift. If $L_s=0$, there is no shift.

The shifted modulation symbol sequence z may be the output of the channel coding and modulation scheme.

Example Embodiment 13

Example Embodiment 13 relates to swap and shift interleaving after the modulation mapper. This embodiment may be obtained on the basis of one of the above example embodiments.

In a specific example of this embodiment, the scrambling and/or interleaving is an interleaving both permutes two neighboring modulation symbols in the modulation symbol sequence $x=[x_0, x_1, x_2, \ldots, x_{Nx-1}]$ according to the fourth bit sequence $s=[s(0), s(1), s(2), \ldots, s(Ns-1)]$ known to both the first node and the second node and cyclic shifts the modulation symbol sequence $x=[x_0, x_1, x_2, \ldots, x_{Nx-1}]$ according to the first integer $L_s$ known to both the first node and the second node and output an interleaved modulation symbol sequence $z=[z_0, z_1, z_2, \ldots, z_{Ns-1}]$ according to at least one of the following:

- $s(i)=1$, the two neighboring modulation symbols are swapped; otherwise, the two neighboring modulation symbols are not swapped;
- $s(i)=0$, the two neighboring modulation symbols are swapped; otherwise, the two neighboring modulation symbols are not swapped;
- Cyclic shift the modulation symbol sequence x to the left by $L_s$ modulation symbols into the shifted modulation symbol sequence z;
- Cyclic shift the modulation symbol sequence x to the right by $L_s$ modulation symbols into the shifted modulation symbol sequence z.

One example specific implemented is as follows:

$z_{2i}=x_{k(2i+s(i))}$ for $i=0,1,2,\ldots,Nx/2-1$, $z_{2i+1}=x_{k(2i+1-s(i))}$ for $i=0,1,2,\ldots,Nx/2-1$, $k(i)=i+L_s \bmod Nx$ for $i=0,1,2,\ldots,Nx-1$, The first integer $L_s$ is determined from the high layer parameters. If $L_s>0$, the cyclic shift is a left cyclic shift. If $L_s<0$, the cyclic shift is a right cyclic shift. If $L_s=0$, there is no shift. $Ns \geq Nx/2$. $s(i)=1$, the two neighboring modulation symbols are swapped; otherwise, the two neighboring modulation symbols are not swapped.

One of the specific implemented can be as follows:

$z_{2i}=x_{k(2i+1-s(i))}$ for $i=0,1,2,\ldots,Nx/2-1$, $z_{2i+1}=x_{k(2i+s(i))}$ for $i=0,1,2,\ldots,Nx/2-1$, $k(i)=i+L_s \bmod Nx$ for $i=0,1,2,\ldots,Nx-1$, The first integer $L_s$ is determined from the high layer parameters. If $L_s>0$, the cyclic shift is a left cyclic shift. If $L_s<0$, the cyclic shift is a right cyclic shift. If $L_s=0$, there is no shift. $s(i)=0$, the two neighboring modulation symbols are swapped; otherwise, the two neighboring modulation symbols are not swapped. $Ns \geq Nx/2$.

One of the specific implemented can be as follows:

$z_{k(i)}=x_{i+(1-2(i \bmod 2)) \cdot s(\lfloor i/2 \rfloor)}$ for $i=0,1,2,\ldots,Nx-1$, $k(i)=i+L_s \bmod Nx$ for $i=0,1,2,\ldots,Nx-1$, The first integer $L_s$ is determined from the high layer parameters. If $L_s>0$, the cyclic shift is a right cyclic shift. If $L_s<0$, the cyclic shift is a left cyclic shift. If $L_s=0$, there is no shift. $s(\lfloor i/2 \rfloor)=1$, the two neighboring modulation symbols are swapped; otherwise, the two neighboring modulation symbols are not swapped. $Ns \geq Nx$.

One of the specific implemented can be as follows:

$z_{k(i)}=x_{i+(1-2(i \bmod 2)) \cdot (1-s(\lfloor i/2 \rfloor))}$ for $i=0,1,2,\ldots,Nx-1$, $k(i)=i+L_s \bmod Nx$ for $i=0,1,2,\ldots,Nx-1$, The first integer $L_s$ is determined from the high layer parameters. If $L_s>0$, the cyclic shift is a right cyclic shift. If $L_s<0$, the cyclic shift is a left cyclic shift. If $L_s=0$, there is no shift. $s(\lfloor i/2 \rfloor)=0$, the two neighboring modulation symbols are swapped; otherwise, the two neighboring modulation symbols are not swapped. $Ns \geq Nx$.

The interleaved modulation symbol sequence z may be the output of the channel coding and modulation scheme.

In some embodiments, interleaving does not change the power of the modulation symbols, thus perverse the power of the modulation symbol and keep the probability distribution of the output modulation symbols.

Example Embodiment 14

Example Embodiment 14 relates to the scrambling and/or interleaving before the modulation mapper. This embodiment may be obtained on the basis of one of the above example embodiments.

In this embodiment, channel coding and modulation for the transport block further comprises the scrambling and/or interleaving.

In a specific example of this embodiment, the scrambling and/or interleaving is before the modulation mapper. FIGS. 2A, 3A, 3C and 4A may provide specific examples that the output of the scrambling and/or interleaving is the input of the modulation mapper.

The interleaved channel coding sequence w can include two parts: a first part of the interleaved channel coding sequence is the first part of the output of the channel coding; a second part of the interleaved channel coding sequence is the at least one portion of the second part of the output of the channel coding.

Example Embodiment 15

Example Embodiment 15 relates to scrambling on the at least one portion of the second part of the output of the channel coding. This embodiment may be obtained on the basis of one of the above example embodiments.

In a specific example of this embodiment, the scrambling and/or interleaving is a bit scrambling performs bit-by-bit modulo-2 operation to the bits of the at least one portion of the second part of the output of the channel coding in the interleaved channel coding sequence w using the fourth bit sequence s known to both the first node and the second node and outputs a scrambled sequence y. One of the specific examples of the fourth bit sequence s is a pseudo-random bit sequence generated by a pseudo-random sequence generator. One of the implementation of the bit scrambling with the first Qb bits in every Qm consecutive bits of the interleaved channel coding sequence w being the at least one portion of the second part of the output of the channel coding is as follows:

$y_{i \cdot Qm+j}=s_{i \cdot Qb+j}+w_{i \cdot Qm+j} \bmod 2$ for $i=0,1,2,\ldots,Nx-1$ and $j=0,1,\ldots,Qb-1$, $y_{i \cdot Qm+j}=w_{i \cdot Qm+j}$ for $i=0,1,2,\ldots,Nx-1$ and $j=Qb, Qb+1,\ldots,Qm-1$, wherein $Nx=Na/2$ for MQAM constellations; otherwise, $Nx=Na$ and Na is the length of the first symbol sequence A. $Qb=2$ for MQAM constellations; otherwise, $Qb>0$; the four bit sequence s with length not less than $Nx \cdot Qb$ is a pseudo-random bit sequence generated by a pseudo-random sequence generator.

One of the implementation of the bit scrambling with the last Qb bits in every Qm consecutive bits of the interleaved channel coding sequence w being the at least one portion of the second part of the output of the channel coding is as follows:

$y_{i \cdot Qm+j}=w_{i \cdot Qm+j}$ for $i=0,1,2,\ldots,Nx-1$ and $j=0,1,\ldots Qm-Qb-1$, $y_{i \cdot Qm+j}=s_{i \cdot Qb+j-Qm-Qb}+w_{i \cdot Qm+j} \bmod 2$ for $i=0,1,2,\ldots,Nx-1$ and $j=Qm-Qb, Qm-Qb+1,\ldots Qm-1$, wherein Nx=Na/2 for MQAM constellations; otherwise, Nx=Na and Na is the length of the first symbol sequence A. Qb=2 for MQAM constellations; otherwise, Qb>0; the fourth bit sequence s with length not less than Nx·Qb is a pseudo-random bit sequence generated by a pseudo-random sequence generator.

In a specific example of this embodiment, the scrambled sequence y may be the input of the modulation mapper.

Example Embodiment 16

Example Embodiment 16 relates to scrambling on the at least one portion of the second part of the output of the channel coding and interleaving the first part of the channel coding. This embodiment may be obtained on the basis of one of the above example embodiments.

In this embodiment, the modulation mapper includes an MQAM constellation.

In a specific example of this embodiment, the scrambling and/or interleaving is a combination of bit scrambling and bit interleaving to the interleaved channel coding sequence $w=[w_0, w_1, w_{Nw-1}]$ according to the fourth bit sequence $s=[s_0, s_1, \ldots, s_{Ns-1}]$ known to both the first node and the second node and output a scrambled and interleaved sequence $y=[y_0, y_1, y_2, \ldots, y_{Nw-1}]$ as follows.

bit scrambling is performed on the first 2 bits in every Qm consecutive bits of the interleaved channel coding sequence w from the at least one portion of the second part of the output of the channel coding.

bit interleaving is performed on the rest Qm−2 bits in every Qm consecutive bits of the interleaved channel coding sequence w from the first part of the output of the channel coding, where using an indication bit from the fourth bit sequence s, if the indication bit is of value d, the bits in the odd position (3, 5, . . . , Qm−1) of every Qm bits is swapped with the bits in the even position (2, 4, . . . , Qm−2) of every Qm bits; otherwise, no swapping is performed, wherein the value d is 0 or 1.

One of the specific implementation can be as follows:

$$y_{i \cdot Qm+j} = s_{3i+j} + w_{i \cdot Qm+j} \bmod 2 \text{ for } i=0,1,2,\ldots,Nx-1 \text{ and } j=0,1$$

$$y_{i \cdot Qm+j} = w_{i \cdot Qm+j+s_{3i+2}} \text{ for } i=0,1,2,\ldots,Nx-1 \text{ and } j=2,4,\ldots,Qm-2$$

$$y_{i \cdot Qm+j} = w_{i \cdot Qm+j+s_{3i+2}} \text{ for } i=0,1,2,\ldots,Nx-1 \text{ and } j=3,5,\ldots,Qm-1$$

where the fourth bit sequence $s=[s_0, s_1, s_2, \ldots, s_{Ns-1}]$ is a pseudo-random bit sequence generated by a pseudo-random sequence generator, Ns≥3Nw is the length of the fourth bit sequence s, Nx=Nw/Qm, Nw is the length of the interleaved channel coding sequence w, and d=1 in this example. One of the specific implementation can be as follows:

$$y_{i \cdot Qm+j} = s_{3i+j} + w_{i \cdot Qm+j} \bmod 2 \text{ for } i=0,1,2,\ldots,Nx-1 \text{ and } j=0,1$$

$$y_{i \cdot Qm+j} = w_{i \cdot Qm+j+(1-s_{3i+2})} \text{ for } i=0,1,2,\ldots,Nx-1 \text{ and } j=2,4,\ldots,Qm-2$$

$$y_{i \cdot Qm+j} = w_{i \cdot Qm+j+(1-s_{3i+2})} \text{ for } i=0,1,2,\ldots,Nx-1 \text{ and } j=3,5,\ldots,Qm-1$$

where the fourth bit sequence $s=[s_0, s_1, s_2, \ldots, s_{Ns-1}]$ is a pseudo-random bit sequence generated by a pseudo-random sequence generator, Ns≥3Nw is the length of the fourth bit sequence s, Nx=Nw/Qm, Nw is the length of the interleaved channel coding sequence w, and d=0 in this example.

In a specific example of this embodiment, the scrambled and interleaved sequence y may be the input of the modulation mapper.

In some embodiments, the scrambling to the second part of the output of the channel coding is needed in a wireless communication system with multiple devices to make the transmit powers of different devices using the same frequency and time resource random, resulting in suppressing interference between these devices. If not careful design, the scrambling may make the modulation sequence output from the channel coding and modulation scheme having constellation points uniformly and randomly distributed. However, non-uniformly distributed constellation points are need for efficient transmission. The scrambling to the second part of the output of the channel coding are designed to retain the non-uniform property of constellation points in the modulation sequence. Specifically, if there is scrambling before the modulation mapper, the scrambling can not operate on the output of the pre-channel coding. To achieving this, the scrambling is only to the second part of the output of the channel coding, while interleaving is operated to the first part of the output of the channel coding.

Example Embodiment 17

Example Embodiment 17 relates to interleaving to the interleaved channel coding sequence by swapping. This embodiment may be obtained on the basis of one of the above example embodiments.

In a specific example of this embodiment, the scrambling and/or interleaving is an interleaving to permute the interleaved channel coding sequence $w=[w_0, w_1, w_2, \ldots, w_{Nw-1}]$ according to the fourth bit sequence $s=[s(0), s(1), s(2), \ldots, s(Ns-1)]$ known to both the first node and the second node and output an interleaved sequence $y=[y_0, y_1, y_2, \ldots, y_{N-1}]$ as follows.

every Qm consecutive bits in the interleaved channel coding sequence w is grouped as an element, where Qm is the modulation order of the modulation mapper.

permute these Qm-bit elements based on the fourth bit sequence $s=[s(0), s(1), s(2), \ldots, s(Ns-1)]$ known to both the first node and the second node.

One of the specific implementations is that the sub sequence $(w_{i \cdot Qm}, w_{i \cdot Qm+1}, \ldots, w_{i \cdot Qm+Qm-1})$ in the interleaved channel coding sequence w is the i-th Qm-bit element of the interleaved channel coding sequence w.

One of the specific examples for the interleaving on the interleaved channel coding sequence w is that the adjacent two Qm-bit elements are swapped if an indication bit from the fourth bit sequence s being of the value d; otherwise, the adjacent two Qm-bit elements are not swapped, where d=0 or 1. One of the specific implemented can be as follows:

$$y_{2i \cdot Qm+j} = w_{(2i+s(i)) \cdot Qm+j} \text{ for } i=0,1,2,\ldots,Nx/2-1 \text{ and } j=0,1,2,\ldots,Qm-1,$$

$$y_{(2i+1) \cdot Qm+j} = w_{(2i+1-s(i)) \cdot Qm+j} \text{ for } i=0,1,2,\ldots,Nx/2-1 \text{ and } j=0,1,2,\ldots,Qm-1,$$

where the indication bit s(i)=d with d=1, the adjacent two Qm-bit elements are swapped; otherwise, the adjacent two Qm-bit elements are not swapped. Ns≥Nx/2.

One of the specific examples can be as follows:

$$y_{2i \cdot Qm+j} = w_{(2i+1-s(i)) Qm+j} \text{ for } i=0,1,2,\ldots,Nx/2-1 \text{ and } j=0,1,2,\ldots,Qm-1,$$

$y_{(2i+1)Qm+j} = w_{(2i-s(i))Qm+j}$ for $i=0,1,2,\ldots,Nx/2-1$ and $j=0,1,2,\ldots,Qm-1$, where the indication bit s(i)=d with d=0, the adjacent two Qm-bit elements are swapped; otherwise, the adjacent two Qm-bit elements are not swapped. Ns≥Nx/2.

One of the specific examples can be as follows:

$y_{2i \cdot Qm+j} = w_{(2i+s(2i)) \cdot Qm+j}$ for $i=0,1,2,\ldots,Nx/2-1$ and $j=0,1,2,\ldots,Qm-1$, $y_{(2i+1)Qm+j} = w_{(2i+1-s(2i)) \cdot Qm+j}$ for $i=0,1,2,\ldots,Nx/2-1$ and $j=0,1,2,\ldots,Qm-1$, where the indication bit s(2i)=d with d=1, the adjacent two Qm-bit elements are swapped; otherwise, the adjacent two Qm-bit elements are not swapped. Ns≥Nx.

One of the specific examples can be as follows:

$y_{2i \cdot Qm+j} = w_{(2i+1-s(2i)) \cdot Qm+j}$ for $i=0,1,2,\ldots,Nx/2-1$ and $j=0,1,2,\ldots,Qm-1$, $y_{(2i+1)Qm+j} = w_{(2i+s(2i)) \cdot Qm+j}$ for $i=0,1,2,\ldots,Nx/2-1$ and $j=0,1,2,\ldots,Qm-1$, where the indication bit $s(\lfloor 2 \rfloor)$=d with d=0, the adjacent two Qm-bit elements are swapped; otherwise, the adjacent two Qm-bit elements are not swapped. Ns≥Nx.

One of the specific examples can be as follows:

$y_{i \cdot Qm+j} = w_{(i+(1-2(i \bmod 2)) \cdot s(\lfloor i/2 \rfloor))Qm+j}$ for $i=0,1,2,\ldots,Nx-1$ and $j=0,1,2,\ldots,Qm-1$, where the indication bit $s(\lfloor i/2 \rfloor)$=d with d=1, the adjacent two Qm-bit elements are swapped; otherwise, the adjacent two Qm-bit elements are not swapped. Ns≥Nx/2.

One of the specific implemented can be as follows:

$y_{i \cdot Qm+j} = w_{(i+(1-2(i \bmod 2)) \cdot (1-s(\lfloor i/2 \rfloor)))Qm+j}$ for $i=0,1,\ldots,Nx-1$ and $j=0,1,\ldots,Qm-1$, where the indication bit $s(\lfloor i/2 \rfloor)$=d with d=0, the adjacent two Qm-bit elements are swapped; otherwise, the adjacent two Qm-bit elements are not swapped. Ns≥Nx/2.

One of the specific implementations can be that the fourth bit sequence s is generated by a pseudo-random sequence generator.

In a specific example of this embodiment, the interleaved sequence y is the input of the modulation mapper.

Example Embodiment 18

Example Embodiment 18 relates to interleaving to the interleaved channel coding sequence by cyclic shifting. This embodiment may be obtained on the basis of one of the above example embodiments.

In a specific example of this embodiment, the scrambling and/or interleaving is an interleaving to permute the interleaved channel coding sequence $w=[w_0, w_1, w_2, \ldots, w_{Nw-1}]$ and output an interleaved sequence $y=[y_0, y_1, y_2, \ldots, y_{Nw-1}]$ as follows: every Qm consecutive bits in the interleaved channel coding sequence w is grouped as an element, where Qm is the modulation order of the modulation mapper, and permute these Qm-bit elements based on a second integer Lb known to both the first node and the second node.

One of the specific example for the interleaving on the interleaved channel coding sequence w is that the interleaved sequence y is a cyclic shift to the interleaved channel coding sequence w according to the second integer Lb known to both the first node and the second by one of the following.

Cyclic shift the interleaved channel coding sequence w to the left by Lb Qm bits into the interleaved sequence y.

Cyclic shift the interleaved channel coding sequence w to the right by Lb Qm bits into the interleaved sequence y.

One of the specific implementations is that the sub sequence $(w_{i \cdot Qm}, w_{i \cdot Qm+1}, \ldots, w_{i \cdot Qm+Qm-1})$ in the interleaved channel coding sequence w is the i-th Qm-bit element of the interleaved channel coding sequence w.

One of the specific implementation can be as follows:

$y_i = w_{r(i)}$ for $i=0,1,2,\ldots,Nw-1$, $r(i) = i + Lb \cdot Qm \bmod Nw$ for $i=0,1,2,\ldots,Nw-1$, One of the specific implementation can be as follows:

$y_{r(i)} = w_i$ for $i=0,1,2,\ldots,Nw-1$, $r(i) = i + Lb \cdot Qm \bmod Nw$ for $i=0,1,2,\ldots,Nw-1$, One of the specific implementations is that the second integer Lb may be determined according to the high layer parameters. If Lb>0, the cyclic shift is a right cyclic shift. If Lb<0, the cyclic shift is a left cyclic shift. If Lb=0, there is no shift.

In a specific example of this embodiment, the interleaved sequence y is the input of the modulation mapper.

Example Embodiment 19

Example Embodiment 19 relates to interleaving to the interleaved channel coding sequence by swapping and cyclic shifting. This embodiment may be obtained on the basis of one of the above example embodiments.

In a specific example of this embodiment, the scrambling and/or interleaving is an interleaving to permute the interleaved channel coding sequence $w=[w_0, w_1, w_2, \ldots, w_{Nw-1}]$ according to the fourth bit sequence $s=[s(0), s(1), s(2), \ldots, s(Ns-1)]$ and the second integer Lb both known to the first node and the second node and output an interleaved sequence $y=[y_0, y_1, y_2, \ldots, y_{Nw-1}]$ as follows: every Qm consecutive bits in the interleaved channel coding sequence w is grouped as an element, where Qm is the modulation order of the modulation mapper, and permute these Qm-bit elements based on both the fourth bit sequence $s=[s(0), s(1), s(2), \ldots, s(Ns-1)]$ and the second integer Lb known to both the first node and the second node.

One of the specific implementations is that the sub sequence $(w_{i \cdot Qm}, w_{i \cdot Qm+1}, w_{i \cdot Qm+Qm-1})$ in the interleaved channel coding sequence w is the i-th Qm-bit element of the interleaved channel coding sequence w.

Further, in a specific example of this embodiment, one of the specific example for the interleaving on the interleaved channel coding sequence w is at least one of the following: the adjacent two Qm-bit elements are swapped if an indication bit from the fourth bit sequence s being of value d; otherwise, the adjacent two Qm-bit elements are not swapped, where d=0 or 1, and cyclic shift the Qm-bit elements of the interleaved channel coding sequence w to the left or right by Lb Qm-bit elements into the interleaved sequence y.

One of the specific implementations can be as follows:

$y_{2i \cdot Qm+j} = w_{r(2i+s(i)) \cdot Qm+j}$ for $i=0,1,2,\ldots,Nx/2-1$ and $j=0,1,\ldots,Qm-1$, $y_{(2i+1) Qm+j} = w_{r(2i+1-s(i)) \cdot Qm+j}$ for $i=0,1,2,\ldots,Nx/2-1$ and $j=0,1,\ldots,Qm-1$, $r(i) = i + Lb \bmod Nx$ for $i=0,1,2,\ldots,Nx-1$, the value d=1.

One of the specific implementations can be as follows:

$y_{2i \cdot Qm+j} = w_{r(2i+1-s(i)) \cdot Qm+j}$ for $i=0,1,2,\ldots,Nx/2-1$ and $j=0,1,\ldots,Qm-1$, $y_{(2i+1) \cdot Qm+j} = w_{r(2i-s(i)) \cdot Qm+j}$ for $i=0,1,2,\ldots,Nx/2-1$ and $j=0,1,\ldots,Qm-1$, $r(i) = i+Lb \bmod Nx$ for $i=0,1,2,\ldots,Nx-1$, the value d=1.
One of the specific implementations can be as follows:

$y_{r(2i) \cdot Qm+j} = w_{(2i+s(i)) \cdot Qm+j}$ for $i=0,1,2,\ldots,Nx/2-1$ and $j=0,1,\ldots,Qm-1$, $y_{(2i+1) \cdot Qm+j} = w_{(2i+1-s(i))-Qm+j}$ for $i=0,1,2,\ldots,Nx/2-1$ and $j=0,1,\ldots,Qm-1$, $r(i) = i+Lb \bmod Nx$ for $i=0,1,2,\ldots,Nx-1$, the value d=1.
One of the specific implementations can be as follows:

$y_{r(2i) \cdot Qm+j} = w_{(2i+1-s(i)) \cdot Qm+j}$ for $i=0,1,2,\ldots,Nx/2-1$ and $j=0,1,\ldots Qm-1$, $y_{r(2i+1) \cdot Qm+j} = w_{(2i-s(i)) \cdot Qm+j}$ for $i=0,1,2,\ldots,Nx/2-1$ and $j=0,1,\ldots,Qm-1$, $r(i) = i+Lb \bmod Nx$ for $i=0,1,2,\ldots,Nx-1$, the value d=1.
One of the specific implementations can be that Lb may be an integer determined according to the high layer parameters. If Lb>0, the cyclic shift is a right cyclic shift. If Lb<0, the cyclic shift is a left cyclic shift. If Lb=0, there is no shift, Nx=Nw/Qm.

In a specific example of this embodiment, the interleaved sequence y is the input of the modulation mapper.

In some embodiments, the interleaving is based on Qm-bit elements, thus the number of different symbols output from the bit-to-symbol encoding is not changed since the interleaving does not permute bits belong to the same symbol output from the symbol-to-bit conversion. As a result, the modulation mapper uses interleaved sequence y as input will preserve the probability of the symbols from the bit-to-symbol encoding, i.e., the probability of the constellation points.

Example Embodiment 20

Example Embodiment 20 relates to modulation mapper after the scrambling and/or interleaving. This embodiment may be obtained on the basis of one of the above example embodiments.

In a specific example of this embodiment, the modulation mapper converts every Qm consecutive bits of the input of the modulation mapper, denoted as $y'=[y'_0, y'_1, y'_2, \ldots, y'_{Ny-1}]$, into a modulation symbol according to the labeling of the constellation of the modulation mapper and outputs a modulation symbol sequence $x=[x_0, x_1, x_2, \ldots, x_{Nx-1}]$. One of the specific implementation is that the label of the modulation symbol $x_i$ is $(y'_{i \cdot Qm}, y'_{i \cdot Qm+1}, y'_{i \cdot Qm+2}, \ldots, y'_{i \cdot Qm+Qm-i})$ for $i=0, 1, 2, \ldots, Nx-1$ with $Ny=Qm \cdot Nx$, wherein Nx is the length of the modulation symbol sequence x, Ny is the length of the input of the modulation mapper y' and Qm is the modulation order of the modulation mapper.

The modulation symbol sequence x may be the output of the channel coding and modulation scheme.

Example Embodiment 21

Example Embodiment 21 relates to the pseudo-random sequence generator and high layer parameters. This embodiment may be obtained on the basis of one of the above example embodiments.

In this embodiment, the high layer parameters can be any parameters in protocol layer excluding layer 1 (L1). In this embodiment, the high layer parameters can be parameters in protocol layers excluding physical layer.

Further, in this embodiment, the pseudo-random sequence generator can be initialed by a seed determined by at least one of the following: an identity of a user equipment, an identity of a base station, an identity of a cell, an identity of a virtual cell, a cell radio network temporary identifier (C-RNTI), a modulation coding scheme C-RNTI (MCS-C-RNTI), a semi-persistent channel state information radio network temporary identifier (SP-CSI-RNTI), a coding scheme RNTI (CS-RNTI), a RNTI, a random access RNTI (RA-RNTI), the higher-layer parameter dataScramblingIndentityPUSCH, the higher-layer parameter msgA-dataScramblingIndentity, the index of the random-access preamble transmitted for msgA, the RA-RNTI for msgA, the RNTI associated with the PUSCH transmission, the higher-layer parameter dataScramblingIndentityPDSCH, the higher-layer parameter AdditionaldataScramblingIndentityPDSCH, and/or physical layer cell identity.

Figure 5:
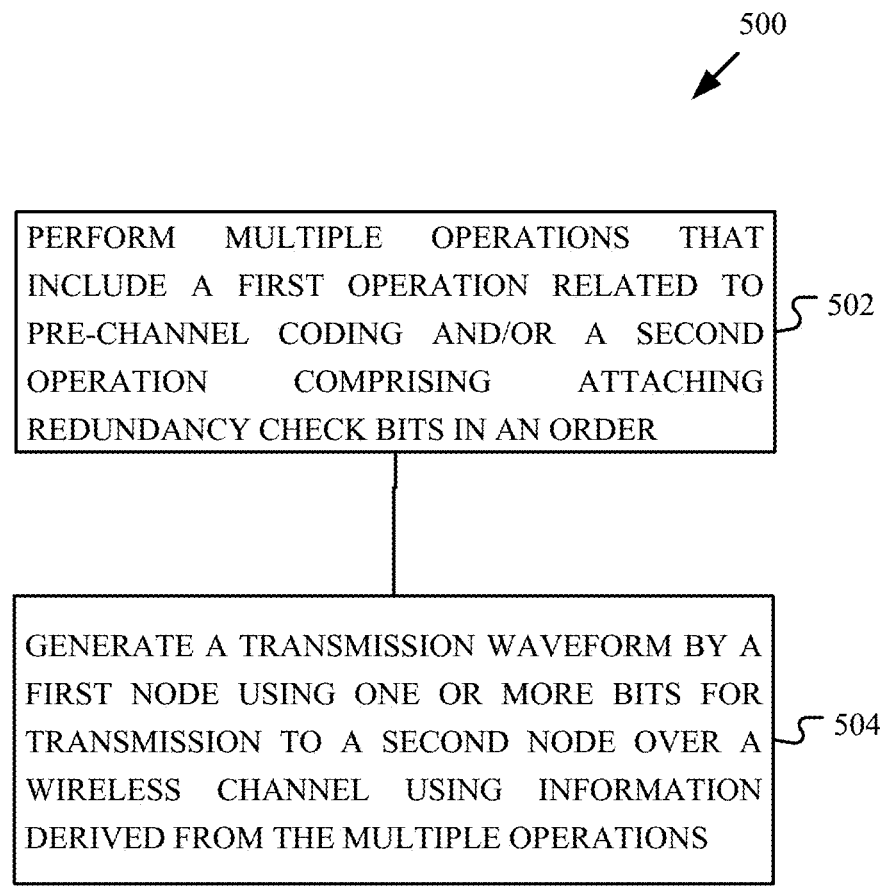
FIG. 5 is a block diagram of an example method for a control channel and modulation.

FIG. 5 is a block diagram 500 of an example method for channel coding and modulation. The method can include performing multiple operations that include a first operation related to pre-channel coding and/or a second operation comprising a transport block cyclic redundancy check (CRC) attachment operation and/or a code block CRC attachment operation in an order (block 502).

The method can also include generating a transmission waveform by a first node using one or more bits for transmission to a second node over a wireless channel using information derived from the multiple operations (block 504). The first node can include a terminal or a network node (e.g., a base station, eNB, gNB) and the second node can include a terminal or a network node (e.g., a base station, eNB, gNB).

In some embodiments, the order includes the first operation being performed prior to the second operation including a transport block cyclic redundancy check (CRC) attachment operation.

In some embodiments, the order includes the first operation being performed after the second operation including a transport block CRC attachment operation.

In some embodiments, the order includes the first operation being performed after the second operation including a code block CRC attachment operation.

In some embodiments, the method includes performing, by the first node, a scrambling operation and an interleaving operation after a modulation mapping operation.

In some embodiments, the scrambling operation comprises a modulation symbol scrambling operation to modify a phase of modulation symbols in a modulation symbol sequence, wherein a phase rotation angle for each modulation symbol includes a value from a set of phase rotation angles, and wherein the modification of the phase of the modulation symbols does not modify a power of a constellation point.

In some embodiments, the phase of each modulation symbol in the modulation symbol sequence is a value from the set of phase rotation angles.

In some embodiments, the phase of each modulation symbol in the modulation symbol sequence is determined based on a complex-value sequence that is known by both the first node and the second node.

In some embodiments, the set of phase rotation angles includes any of 90 degrees, 180 degrees, 270 degrees, and 360 degrees.

In some embodiments, the set of phase rotation angles includes a subset of the set including 0 degrees, 90 degrees, 180 degrees, 270 degrees, and 360 degrees.

In some embodiments, the interleaving operation is performed using the modulation symbol sequence, wherein a result of the interleaving operation comprises an interleaved modulation sequence.

In some embodiments, the interleaving operation includes any of: swapping every two consecutive modulation symbols in the modulation symbol sequence based on a fourth bit sequence, performing a cyclic left or right shift to the modulation symbol sequence based on a first integer, performing the cyclic left or right shift based on the first integer and swapping every two consecutive modulation symbols based on the fourth bit sequence to the modulation symbol sequence, wherein both the fourth bit sequence and the first integer are known by both the first node and the second node.

In some embodiments, the method includes performing, by the first node, a scrambling operation and/or an interleaving operation before a modulation mapping operation.

In some embodiments, the scrambling operation comprises a bit scrambling operation that is performed to a first set of bits that excludes a set of output bits of the first operation relating to pre-channel coding.

In some embodiments, the interleaving operation is performed on the set of output bits of the first operation relating to pre-channel coding.

In some embodiments, the interleaving operation is performed on a set of at least one portion of output bits of the first operation.

In some embodiments, the interleaving operation permutes bit elements of the first set of bits, wherein a bit length of the bit elements includes a length of labeling of a symbol set included in the modulation mapping operation.

In some embodiments, the interleaving operation permutes Qa-bit elements of the output bits of the first operation, wherein a bit length of the Qa-bit elements includes a length of labeling of a symbol set included in the modulation mapping operation.

In some embodiments, labelling of a symbol set included in the modulation mapping operation includes a first label of a smallest symbol in the symbol set including more 1 values than that of a second label of a largest symbol in the symbol set.

In some embodiments, labelling of a symbol set included in the modulation mapping operation comprises a label for all 1 values being mapping to a constellation point with a smallest power value.

In some embodiments, the constellation point included in the modulation mapping operation relates to any of M-ary Quadrature Amplitude Modulation (MQAM), M-ary amplitude shift keying (MASK), M-ary amplitude phase shift keying (MAPSK), and M-ary Phase-Shift Keying (MPSK), wherein M is the number of constellation points in a constellation.

In some embodiments, the first operation includes any of: source coding related encoding, energy threshold encoding, minimum energy encoding, variable-length encoding, and non-linear coding.

In some embodiments, the second operation further comprises any of: low-density parity-check coding, polar coding, turbo coding, and convolutional coding.

In some embodiments, the modulation mapping operation comprises a high-order modulation operation.

In some embodiments, the scrambling operation does not scramble output bits of the first operation and the interleaving operation does not permute consecutive bits relating to output bits that correspond to a symbol in a symbol-to-bit conversion included in the first operation.

In some embodiments, the interleaving operation includes any of: swapping every two consecutive bit elements in an input bit sequence based on a fourth bit sequence, performing a cyclic left or right shift of the bit elements of the input bit sequence based on a second integer, performing the cyclic left or right shift based on the second integer and swapping every two consecutive bit elements to the input bit sequence based on the fourth bit sequence, wherein both the fourth bit sequence and the second integer are known to both the first node and the second node.

In some embodiments, the method includes performing, by the first node, a scrambling operation and/or an interleaving operation after performance of a modulation mapping operation, wherein any of the scrambling operation and/or the interleaving operation includes any of: a modulation symbol scrambling comprising a phase rotation operation for a complex-value modulation symbol sequence that does not modify a complex-modulus of modulation symbols and permuting a modulation symbol sequence output from the modulation mapping operation.

In some embodiments, the second operation relating to CRC attachment of blocks relates to any of: transport block CRC attachment, code block segmentation, and code block CRC attachment, wherein the first operation is performed before or after the transport block CRC attachment, or the first operation is performed after the code block CRC attachment.

In some embodiments, the modulation mapping operation relates to M-ary Quadrature Amplitude Modulation (QAM) constellations and a first bit among each modulation order (Qm) bit determines a sign of the real part of a modulation symbol, a second bit relating to a set of Qm bits determines a sign of the imaginary part of the modulation symbol, a first $Qm/2-1$ bit of the set of Qm bits determines an absolute value of the real part of the modulation symbol, and a second $Qm/2-1$ bit of the set of Qm bits determines an absolute value of the imaginary part of the modulation symbol.

In some embodiments, the first bit among each modulation order (Qm) bit is scrambled by a first indication bit from the fourth bit sequence, the second bit relating to the set of Qm bits is scrambled by a second indication bit from the fourth bit sequence, and the first $Qm/2-1$ bit of the set of Qm bits and the second $Qm/2-1$ bit of the set of Qm bits are swapped if a third indication bit from the fourth bit sequence is of value d; otherwise the first $Qm/2-1$ bit of the set of Qm bits and the second $Qm/2-1$ bit of the set of Qm bits are not swapped, wherein d is 0 or 1.

In some embodiments, a part of a set of Qa bits among the set of Qm bits determines a complex modulus of the modulation symbol, and wherein a part of a set of Qm-Qa bits among the set of Qm bits determines a phase of the modulation symbol.

In some embodiments, any of the complex-value sequence, the fourth bit sequence, the first integer and the second integer is generated by a pseudo-random sequence generator that is initialed by a seed that is determined by any of: an identity of the first node, an identity of the second node, an identity of a cell, an identity of a virtual cell, a cell radio network temporary identifier (C-RNTI), a modulation coding scheme C-RNTI (MCS-C-RNTI), a semi-persistent channel state information radio network temporary identifier (SP-CSI-RNTI), a coding scheme RNTI (CS-RNTI), a RNTI, a random access RNTI (RA-RNTI), a higher-layer parameter dataScramblingIndentityPUSCH, a higher-layer parameter msgA-dataScramblingIndentity, an index of a random-access preamble transmitted for a first message, an RA-RNTI for the first message, an RNTI associated with a PUSCH transmission, a higher-layer parameter dataScramblingIndentityPDSCH, a higher-layer parameter AdditionaldataScramblingIndentityPDSCH, and a physical layer cell identity.

Example Wireless System

Figure 6:
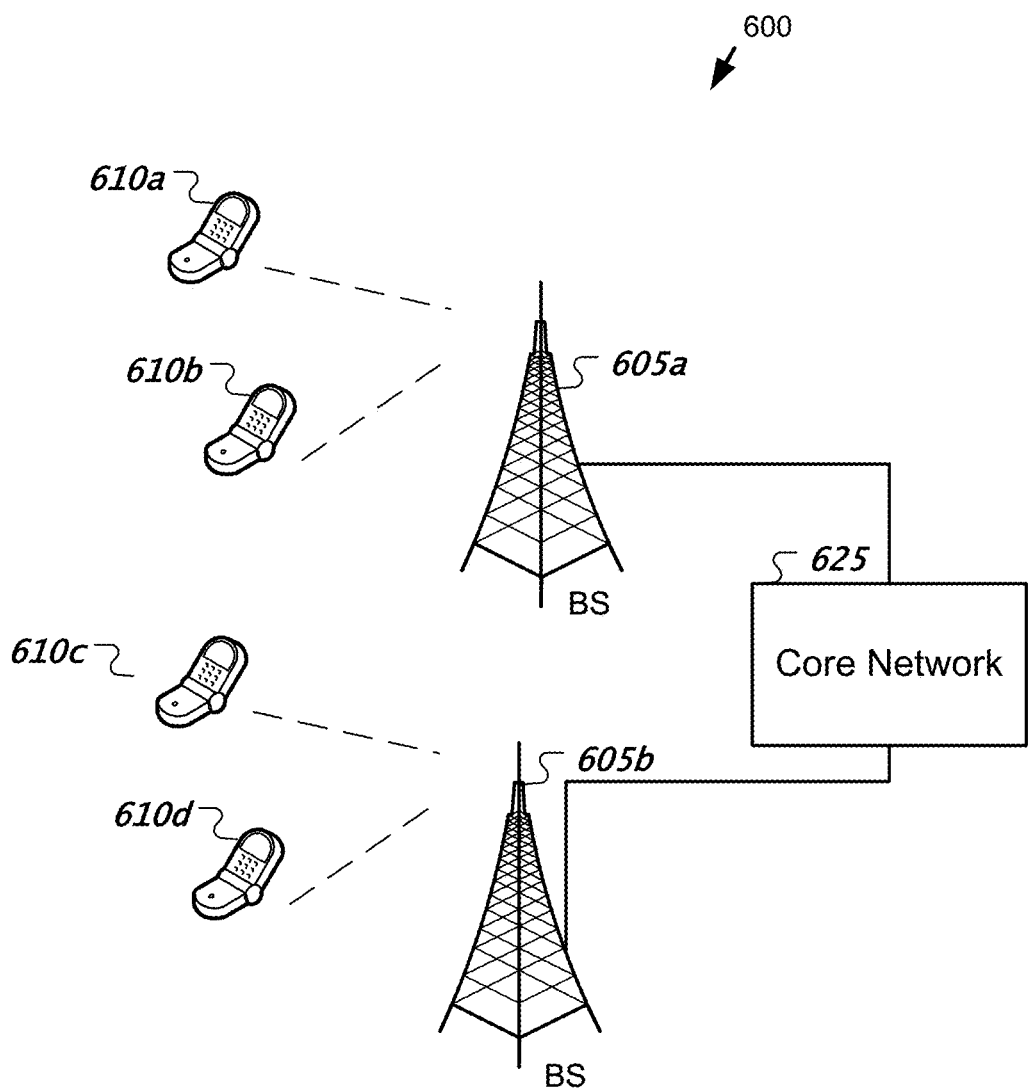
FIG. 6 shows an example of a wireless communication system where techniques in accordance with one or more embodiments of the present technology can be applied.

FIG. 6 shows an example of a wireless communication system where techniques in accordance with one or more embodiments of the present technology can be applied. A wireless communication system 600 can include one or more base stations (BSs) 605a, 605b, one or more wireless devices or terminals 610a, 610b, 610c, 610d, and a core network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors. The base station may implement functionalities of a scheduling cell or a candidate cell, as described in the present document.

The core network 625 can communicate with one or more base stations 605a, 605b. The core network 625 provides connectivity with other wireless communication systems and wired communication systems. The core network may include one or more service subscription databases to store information related to the subscribed wireless devices 610a, 610b, 610c, and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The wireless devices 610a, 610b, 610c, and 610d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 7:
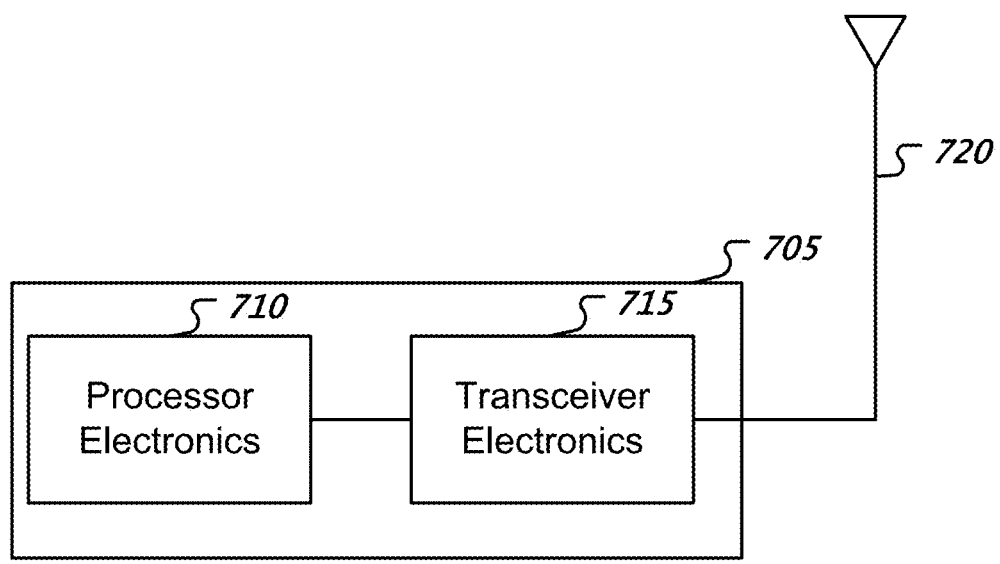
FIG. 7 is a block diagram representation of a portion of a hardware platform.

FIG. 7 is a block diagram representation of a portion of a hardware platform. A hardware platform 705 such as a network node or a base station or a terminal or a wireless device (or UE) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 or a wireline interface. The hardware platform 705 can implement other communication interfaces with defined protocols for transmitting and receiving data. The hardware platform 705 can include one or more memories (not explicitly shown) configured to store information such as data and/or instructions.

In some implementations, the processor electronics 710 can include at least a portion of the transceiver electronics 715. In some embodiments, at least some of the disclosed techniques, modules or functions are implemented using the hardware platform 705.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:
performing, by a first node, multiple operations that include a first operation related to pre-channel coding and a second operation comprising attaching redundancy check bits in an order that includes the first operation being performed prior to the second operation; and
generating a transmission waveform by the first node using one or more bits for transmission to a second node over a wireless channel using information derived from the multiple operations.

2. The method of claim 1, wherein the second operation includes a transport block cyclic redundancy check (CRC) attachment operation.

3. The method of claim 1, wherein the second operation includes a code block CRC attachment operation.

4. The method of claim 1, further comprising:
performing, by the first node, at least one of a scrambling operation or an interleaving operation after a modulation mapping operation.

5. The method of claim 4, wherein the scrambling operation comprises a modulation symbol scrambling operation to modify a phase of modulation symbols in a modulation symbol sequence, wherein a phase rotation angle for each modulation symbol includes a value from a set of phase rotation angles.

6. The method of claim 5, wherein the phase of each modulation symbol in the modulation symbol sequence is a value from the set of phase rotation angles.

7. The method of claim 5, wherein the phase of each modulation symbol in the modulation symbol sequence is determined based on a specified complex-value sequence.

8. The method of claim 5, wherein the set of phase rotation angles includes a subset of: 0 degrees, 90 degrees, 180 degrees, 270 degrees, and 360 degrees.

9. The method of claim 4, wherein the interleaving operation is performed using a modulation symbol sequence, wherein a result of the interleaving operation comprises an interleaved modulation sequence.

10. The method of claim 4, wherein the interleaving operation includes any of: swapping every two consecutive modulation symbols in a modulation symbol sequence based on a specified bit sequence, performing a cyclic left or right shift to the modulation symbol sequence based on a specified integer, performing the cyclic left or right shift based on the specified integer and swapping every two consecutive modulation symbols based on the specified bit sequence to the modulation symbol sequence.

11. The method of claim 1, further comprising:
performing, by the first node, at least one of a scrambling operation or an interleaving operation before a modulation mapping operation.

12. The method of claim 11, wherein the scrambling operation comprises a bit scrambling operation that is performed to a first set of bits that excludes a set of output bits of the first operation relating to pre-channel coding.

13. The method of claim 11, wherein the interleaving operation is performed on a set of output bits of the first operation relating to pre-channel coding.

14. The method of claim 11, wherein the interleaving operation permutes bit elements of a first set of bits, wherein a bit length of the bit elements includes a length of labeling of a symbol set included in the modulation mapping operation.

15. The method of claim 11, wherein the interleaving operation permutes Qm-bit elements of a set of output bits of the first operation, wherein a bit length of the Qm-bit elements includes a length of labeling of the modulation mapping operation.

16. The method of claim 11, wherein labelling of a symbol set included in the modulation mapping operation includes a first label of a smallest symbol in the symbol set including more 1 values than that of a second label of a largest symbol in the symbol set.

17. The method of claim 11, wherein labelling of a symbol set included in the modulation mapping operation comprises a label for all 1 values being mapping to a constellation point with a smallest power value.

18. An apparatus for wireless communication comprising a processor and a memory storing instructions that, when executed by the processor, cause the apparatus to:
perform multiple operations that include a first operation related to pre-channel coding and a second operation comprising attaching redundancy check bits in an order that includes the first operation being performed prior to the second operation; and
generate a transmission waveform using one or more bits for transmission to a node over a wireless channel using information derived from the multiple operations.

19. A non-transitory computer readable medium having code stored thereon, the code when executed by a processor, causing the processor to:
  perform multiple operations that include a first operation related to pre-channel coding and a second operation comprising attaching redundancy check bits in an order that includes the first operation being performed prior to the second operation; and
  generate a transmission waveform using one or more bits for transmission to a node over a wireless channel using information derived from the multiple operations.

20. The method of claim 1, wherein the first operation related to pre-channel coding comprises at least one of a bit-to-symbol encoding or a symbol-to-bit conversion.

* * * * *